US010789372B2

(12) United States Patent
Ge et al.

(10) Patent No.: US 10,789,372 B2
(45) Date of Patent: Sep. 29, 2020

(54) PRIMARY DEVICE, AN ACCESSORY DEVICE, AND METHODS FOR PROCESSING OPERATIONS ON THE PRIMARY DEVICE AND THE ACCESSORY DEVICE

(71) Applicant: Samsung Electronics Co., Ltd., Suwon-si, Gyeonggi-do (KR)

(72) Inventors: Ying Ge, Nanjing (CN); Bilan Huang, Nanjing (CN); Jiajun Liu, Nanjing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 100 days.

(21) Appl. No.: 15/678,609

(22) Filed: Aug. 16, 2017

(65) Prior Publication Data
US 2018/0053006 A1 Feb. 22, 2018

(30) Foreign Application Priority Data

Aug. 16, 2016 (CN) .......................... 2016 1 0673732

(51) Int. Cl.
G06F 21/60 (2013.01)
H04W 12/06 (2009.01)
(Continued)

(52) U.S. Cl.
CPC ............ G06F 21/602 (2013.01); G06F 21/31 (2013.01); G06F 21/34 (2013.01); G06F 21/35 (2013.01);
(Continued)

(58) Field of Classification Search
None
See application file for complete search history.

(56) References Cited

U.S. PATENT DOCUMENTS 7,715,560 B2* 5/2010 Lai ........................ H04M 1/677
380/252
7,730,142 B2* 6/2010 LeVasseur ............ H04L 63/126
709/206
(Continued)

FOREIGN PATENT DOCUMENTS

CN 101657821 A 2/2010
CN 103473514 A 12/2013
(Continued)

OTHER PUBLICATIONS

Examination Office Action Report dated Aug. 22, 2018, issued in the State Intellectual Property Office of People's Republic of China, Application No. 201610673732.6.
(Continued)

Primary Examiner — Saleh Najjar
Assistant Examiner — Michael W Chao
(74) Attorney, Agent, or Firm — Jefferson IP Law, LLP

(57) ABSTRACT

In accordance with an aspect of the present disclosure, a method for encrypting/hiding or decrypting/unhiding a target object on a device is provided. The method comprises binding with a binding module; detecting an operation instruction for the target object; analyzing the detected operation instruction; outputting information to be confirmed for encrypting or hiding the target object if the detected operation instruction for the target object is a preset encryption instruction or a preset hiding instruction; and encrypting or hiding the target object after receiving a confirmation input.

21 Claims, 16 Drawing Sheets

(51) Int. Cl.

| | | |
|---|---|---|
| *G06F 21/55* | (2013.01) | |
| *H04L 29/06* | (2006.01) | |
| *H04W 12/00* | (2009.01) | |
| *G06F 21/62* | (2013.01) | |
| *H04W 12/02* | (2009.01) | |
| *G06F 21/35* | (2013.01) | |
| *G06F 21/34* | (2013.01) | |
| *G06F 21/31* | (2013.01) | |

(52) U.S. Cl.
CPC ............ *G06F 21/554* (2013.01); *G06F 21/60* (2013.01); *G06F 21/62* (2013.01); *G06F 21/6218* (2013.01); *G06F 21/6245* (2013.01); *H04L 63/083* (2013.01); *H04W 12/003* (2019.01); *H04W 12/02* (2013.01); *H04W 12/06* (2013.01); *G06F 21/6209* (2013.01); *G06F 2221/2107* (2013.01)

(56) References Cited

U.S. PATENT DOCUMENTS

| | | | |
|---|---|---|---|
| 8,387,141 B1* | 2/2013 | Zhukov | H04L 51/12 726/22 |
| 9,015,077 B2 | 4/2015 | Kim et al. | |
| 9,076,008 B1* | 7/2015 | Moy | G06F 21/60 |
| 9,165,128 B1* | 10/2015 | Daniel | G06F 21/6218 |
| 9,805,214 B2* | 10/2017 | Sahu | H04W 12/0013 |
| 10,003,964 B1 | 6/2018 | Blintsov | H04W 12/02 |
| 2003/0231207 A1* | 12/2003 | Huang | H04L 51/12 715/752 |
| 2004/0004958 A1* | 1/2004 | Wang | H04L 12/14 370/352 |
| 2004/0193910 A1 | 9/2004 | Moles | |
| 2007/0255963 A1* | 11/2007 | Pizano | G06F 21/32 713/189 |
| 2008/0256641 A1 | 10/2008 | Lo | |
| 2010/0257251 A1 | 10/2010 | Mooring et al. | |
| 2011/0126009 A1 | 5/2011 | Camp, Jr. et al. | |
| 2011/0287741 A1* | 11/2011 | Prabhu | G06F 21/32 455/411 |
| 2013/0082819 A1 | 4/2013 | Cotterill | |
| 2014/0337634 A1* | 11/2014 | Starner | H04L 9/3231 713/186 |
| 2014/0359790 A1* | 12/2014 | Zou | G06F 21/31 726/28 |
| 2015/0162994 A1* | 6/2015 | Rodzevski | H04W 4/80 455/39 |
| 2015/0207795 A1* | 7/2015 | Wentz | G06F 21/44 726/4 |
| 2015/0261972 A1* | 9/2015 | Lee | G06F 21/6218 713/165 |
| 2015/0286813 A1* | 10/2015 | Jakobsson | G06F 21/35 726/9 |
| 2015/0319147 A1* | 11/2015 | Lin | H04L 63/083 713/165 |
| 2015/0347738 A1* | 12/2015 | Ulrich | G06F 21/34 726/17 |
| 2015/0371073 A1* | 12/2015 | Cho | G06K 9/00013 382/124 |
| 2016/0014258 A1* | 1/2016 | Hwang | H04M 1/72544 455/418 |
| 2016/0034707 A1* | 2/2016 | Sahu | H04W 12/0013 713/168 |
| 2016/0034708 A1* | 2/2016 | Shim | G06F 21/6245 713/186 |
| 2016/0042166 A1* | 2/2016 | Kang | G06F 21/32 726/7 |
| 2016/0070900 A1* | 3/2016 | Kim | G06F 21/35 726/3 |
| 2016/0117141 A1* | 4/2016 | Ro | G06F 3/1454 715/748 |
| 2016/0180072 A1* | 6/2016 | Ligatti | H04L 63/0853 726/7 |
| 2016/0197916 A1* | 7/2016 | Ravindran | H04L 63/0861 726/4 |
| 2016/0337863 A1* | 11/2016 | Robinson | H04W 12/08 |
| 2016/0342784 A1* | 11/2016 | Beveridge | G06F 21/35 |
| 2017/0083227 A1* | 3/2017 | Hemaraj | G06F 3/0488 |
| 2017/0150305 A1 | 5/2017 | Chaudhri et al. | |
| 2017/0372055 A1* | 12/2017 | Robinson | H04W 12/06 |
| 2018/0035296 A1* | 2/2018 | Wu | H04M 1/7253 |
| 2019/0073486 A1* | 3/2019 | Peterson | G06F 21/6218 |
| 2019/0303553 A1* | 10/2019 | Choiniere | G06F 1/163 |

FOREIGN PATENT DOCUMENTS

| | | |
|---|---|---|
| CN | 105122151 A | 12/2015 |
| CN | 105320874 A | 2/2016 |
| KR | 10-2016-0016522 A | 2/2016 |
| WO | 2016/018028 A1 | 2/2016 |
| WO | 2016/054912 A1 | 4/2016 |

OTHER PUBLICATIONS

European Search Report dated Feb. 20, 2019; European Appln. No. 17841673.1-1218.

* cited by examiner

PRIMARY DEVICE, AN ACCESSORY DEVICE, AND METHODS FOR PROCESSING OPERATIONS ON THE PRIMARY DEVICE AND THE ACCESSORY DEVICE

CROSS-REFERENCE TO RELATED APPLICATION(S)

This application claims the benefit under 35 U.S.C. § 119(a) of a Chinese patent application filed on Aug. 16, 2016 in the State Intellectual Property Office of the People's Republic of China and assigned Serial number 201610673732.6, the entire disclosure of which is hereby incorporated by reference.

TECHNICAL FIELD

The present disclosure relates to the field of device information processing. More particularly, the present disclosure relates to a primary device, an accessory device, and methods for processing operations on the primary device and the accessory device.

BACKGROUND ART

So far, there are several methods for encrypting/decrypting or hiding/unhiding a target object on a device according to the related art. These methods are described as follows.

For applications, relevant encrypting/decrypting or hiding/unhiding methods include "hiding a window", "gesture interactions", "scene mode", "time, place, and location", "classification hiding", "parasitism hiding", "page hiding", etc.

For text information, relevant encrypting/decrypting or hiding/unhiding methods include "changing font", "hiding layer", "text rotation", "watermark embedding", "self-defined filtering", "preset conditions", "a hiding instruction", etc.

For contact information, relevant methods include "identifying on or off state", "preset instructions", etc.

For a photo, relevant encrypting/decrypting methods include "fingerprint encryption", "identifier encryption", "real-time data encoding", "password input", etc.

Other encrypting/decrypting and hiding/unhiding methods according to the related art may include "fingerprint", "self-defined characters", "key", "password input sequence encryption", "finger pressing encryption", etc.

However, the methods in the related art have the following disadvantages:

(1) With respect to the fingerprint encryption methods, support of the fingerprint identification technology is required. Therefore, the cost of hardware is increased.

(2) With respect to the password input encryption/decryption methods, the interactions are relatively complex. Moreover, the password may be leaked easily, thus the security cannot be ensured.

(3) With respect to the method of unlocking via preset instructions, a user needs to memorize various gestures corresponding to different commands. Therefore, the burden of memorizing on the user is heavy, and it is inconvenient for the user to use.

(4) With respect to the gesture encryption methods, the security cannot be ensured. For example, once a mobile phone is used by others, personal information may be leaked easily.

(5) In related-art methods, only designated contents can be encrypted/decrypted or hidden/unhidden.

In conclusion, the encryption/decryption or hiding/unhiding methods according to the related art have low security level on the whole, and are not convenient to use.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, aspects of the present disclosure provide a primary device, an accessory device and methods for processing operations on the primary device and the accessory device to ensure the security and facilitate the use of the user.

The technical scheme is as follows:

In accordance with an aspect of the present disclosure, a method for encrypting/hiding or decrypting/unhiding a target object on a device is provided. The method comprises binding with a binding module; detecting an operation instruction for the target object; analyzing the detected operation instruction; outputting information to be confirmed for encrypting or hiding the target object if the detected operation instruction for the target object is a preset encryption instruction or a preset hiding instruction; and encrypting or hiding the target object after receiving a confirmation input.

In an embodiment, the method further comprises outputting information to be confirmed for decrypting or unhiding the target object if the detected operation instruction for the target object is a preset decryption instruction or a preset unhiding instruction; and decrypting or unhiding the target object after receiving a confirmation input.

In an embodiment, the method further comprises sending an encryption request or a hiding request to the request processing module after receiving the confirmation input.

In an embodiment, the method further comprises outputting an encryption success prompt message or a hiding success prompt message after encrypting or hiding the target object; and sending an encryption success notification or a hiding success notification by an encryption processing module or a hiding processing module.

In an embodiment, binding with the binding module comprises pairing with the binding module through a designated communication protocol; prompting for an account number and a password of the device; checking the account number input and the password input for binding with the binding module; and binding with the binding module if the checking is successful.

In an embodiment, the method further comprises prompting for setting a decryption operation or an unhiding operation after the checking is successful; receiving an input operation; and storing the input operation to an interaction storage module.

In an embodiment, the method further comprises prompting for an account number and a password after receiving an instruction for unbinding with the binding module; checking the account number input and the password input for unbinding with the binding module; and unbinding with the binding module if the checking is successful.

In an embodiment, detecting the operation instruction for the target object comprises: detecting an operation instruction for some contents of the target object.

In an embodiment, the method further comprises identifying whether information received has designated privacy information; and hiding automatically the privacy information if the received information has the designated privacy information.

The method according to claim 1, further comprising: searching whether there is the binding module that has a binding relationship with the device if the detected operation instruction for the target object is a preset decryption instruction or a preset unhiding instruction; and sending a decryption request or an unhiding request to the request processing module if there is the binding module that has the binding relationship.

In accordance with an aspect of the present disclosure, a first device comprises a transceiver configured to communicate with a second device; at least one processor coupled to the transceiver; and a memory coupled to the at least one processor, storing one or more computer programs to be executed by the at least one processor, the one or more computer programs including instructions for a binding module, configured to bind with the second device through the transceiver, a detection module, configured to detect an operation instruction for a target object, an encrypting/hiding module, configured to determine whether the operation instruction detected by the detection module is a preset encryption instruction or a preset hiding instruction, output information to be confirmed for encrypting or hiding the target object if the detected operation instruction for the target object is a preset encryption instruction or a preset hiding instruction, and encrypt or hide the target object after receiving a confirmation input.

In an embodiment, the encrypting/hiding module is further configured to outputting information to be confirmed for decrypting or unhiding the target object if the detected operation instruction for the target object is a preset decryption instruction or a preset unhiding instruction; and decrypting or unhiding the target object after receiving a confirmation input.

In an embodiment, the device further comprises a decrypting/unhiding request module configured to send a decryption request or an unhiding request to the second device bound if the operation instruction detected by the first detection module is a preset decryption instruction or a preset unhiding instruction.

In an embodiment, the device outputs an encryption success prompt message or a hiding success prompt message after encrypting or hiding the target object and sends an encryption success notification or a hiding success notification to the second device.

In an embodiment, the binding module further configured to pair with the second device through a designated communication protocol; prompt for an account number and a password of the first device; checking the account number and the password input for binding with the second device; and bind with the second device if the checking is successful.

In an embodiment, the device is further configured to prompt for setting a decryption operation or an unhiding operation after the checking is successful; receive an input operation; and sending the input operation to the bound second device, wherein the input operation is configured as a preset decryption operation or a preset unhiding operation of the bound second device.

In an embodiment, the binding module is further configured to prompt for an account number and a password after receiving an instruction for unbinding with the second device; check the account number input and the password input for unbinding with the second device; and unbind with the second device if the checking is successful.

In an embodiment, the first device is further configured to search whether there is the second device that has a binding relationship with the first device if the detected operation instruction for the target object is a preset decryption instruction or a preset unhiding instruction; and send a decryption request or an unhiding request to the second device if there is the second device that has the binding relationship with the first device.

In an embodiment, the first device is further configured to identify whether information received by the first device has designated privacy information; hide automatically the privacy information if the information received has the designated privacy information; and send the privacy information to the bound second device to notify the second device to display the privacy information on the second device itself In accordance with an aspect of the present disclosure, a first device, comprises a transceiver configured to communicate with a second device; at least one processor coupled to the transceiver; and a memory coupled to the at least one processor, storing one or more computer programs to be executed by the at least one processor, the one or more computer programs including instructions for a binding module, configured to bind with the second device a request processing module, configured to receive a request from the second device bound, and output a decryption prompt message or an unhiding prompt message after receiving a decryption request or an unhiding request from the second device bound a detection module, configured to detect an input operation; and a response processing module, configured to determine whether the input operation detected by the detection module is the same as a pre-stored decryption operation or a pre-stored unhiding operation, and send a decryption success response or an unhiding success response to the second device that sends the decryption request or the unhiding request.

In accordance with an aspect of the present disclosure, a method for processing an operation on a primary device is provided. The method includes binding with an accessory device, detecting an operation instruction for a target object, encrypting or hiding the target object when the detected operation instruction for the target object is a preset encryption instruction or a preset hiding instruction, sending a decryption request or an unhiding request to the bound accessory device when the detected operation instruction for the target object is a preset decryption instruction or a preset unhiding instruction, and decrypting the target object or unhiding the target object after receiving a decryption success response or an unhiding success response from the bound accessory device.

In an embodiment, the operation of encrypting or hiding the target object may include outputting information to be confirmed for encrypting or hiding the target object, and encrypting or hiding the target object after receiving a confirmation input.

In an embodiment, the operation of sending a decryption request or an unhiding request to the bound accessory device may include outputting information to be confirmed for decrypting or unhiding the target object, and sending the decryption request or the unhiding request to the bound accessory device after receiving a confirmation input.

In an embodiment, the method may further include outputting an encryption success prompt message or a hiding success prompt message after encrypting or hiding the target object, and sending an encryption success notification or a hiding success notification to the accessory device bound.

In an embodiment, the operation of binding with an accessory device may include pairing with the accessory device through a designated communication protocol, prompting for inputting an account number and a password of the primary device, and checking the account number and the password input, wherein the primary device is successfully bound with the accessory device if the checking is successful.

In an embodiment, the method may further include prompting for setting of a decryption operation or an unhiding operation of the accessory device after the checking is successful, receiving an input operation, and sending the input operation to the bound accessory device, wherein the input operation is configured as a preset decryption operation or a preset unhiding operation of the bound accessory device.

In an embodiment, the method may further include prompting for inputting the account number and the password of the primary device after receiving an instruction for unbinding with a designated accessory device, checking the account number and the password input, and unbinding with the designated accessory device after the checking is successful.

In an embodiment, the operation of detecting an operation instruction for a target object comprises detecting an operation instruction for some contents of the target object.

In an embodiment, the method may further include identifying whether information received by the primary device from the outside has designated privacy information, if the information has designated privacy information, hiding automatically the privacy information, and sending the privacy information to the bound accessory device to notify the accessory device to display the privacy information on the accessory device.

In an embodiment, the method may further include searching whether there is an accessory device that has a binding relationship with the primary device when the detected operation instruction for the target object is a preset decryption instruction or a preset unhiding instruction, and if there is an accessory device that has a binding relationship with the primary device, sending a decryption request or an unhiding request to the accessory device.

In accordance with another aspect of the present disclosure, a method for processing an operation of an accessory device is provided. The method includes binding with a primary device, outputting a decryption prompt message or an unhiding prompt message after receiving a decryption request or an unhiding request from the primary device bound, detecting an input operation, and sending a decryption success response or an unhiding success response to the primary device that sends the decryption request or the unhiding request when the detected input operation is the same as a pre-stored decryption operation or a pre-stored unhiding operation.

In an embodiment, the method may further include outputting an encryption success message or a hiding success message after receiving encryption success notification or hiding success notification from the primary device bound.

In an embodiment, the method may further include receiving an input operation sent by the primary device when binding with the primary device, and configuring the input operation as a preset decryption operation or a preset unhiding operation of the accessory device.

In an embodiment, the method may further include receiving privacy information sent by the primary device bound, and displaying the privacy information.

In accordance with another aspect of the present disclosure, a primary device is provided. The primary device includes a primary binding module, configured to bind with an accessory device, a primary detection module, configured to detect an operation instruction for a target object, an encrypting/hiding module, configured to determine whether the operation instruction detected by the primary detection module is a preset encryption instruction or a preset hiding instruction, and encrypting or hiding the target object when the operation instruction detected by the primary detection module is a preset encryption instruction or a preset hiding instruction, an decrypting/unhiding request module, configured to determine whether the operation instruction detected by the primary detection module is a preset decryption instruction or a preset unhiding instruction, and sending a decryption request or an unhiding request to the accessory device bound when the operation instruction detected by the primary detection module is a preset decryption instruction or a preset unhiding instruction, and a decryption/unhiding module, configured to receive a response returned by the accessory device bound, and decrypt the target object or unhide the target object after receiving a decryption success response or an unhiding success response from the accessory device bound.

In an embodiment, an accessory device may include an accessory binding module, configured to bind with a primary device, a request processing module, configured to receive a request from the primary device bound, and output corresponding decryption prompt message or unhiding prompt message after receiving a decryption request or an unhiding request from the primary device bound, an accessory detection module, configured to detect an input operation, and a response processing module, configured to determine whether the input operation detected by the accessory detection module is the same as a pre-stored decryption operation or a pre-stored unhiding operation, and send a decryption success response or an unhiding success response to the primary device that sends the decryption request or the unhiding request.

Compared with the related art methods, aspects of the present disclosure provide an improved method for content encryption/decryption or hiding/unhiding through interactions between the primary device and the accessory device. By means of cooperation between the primary device and the accessory device, encryption/decryption or hiding/unhiding of contents on the primary device can be implemented. Because at least two devices are required for operations on site, even if the primary device is lost or the password has been leaked, information leakage of the target object will be prevented, thus the security can be guaranteed. Meanwhile, because the accessory device participates in decoding or unhiding, a user does not need to set a very complicated password or gesture, thereby facilitating the usage of the user.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
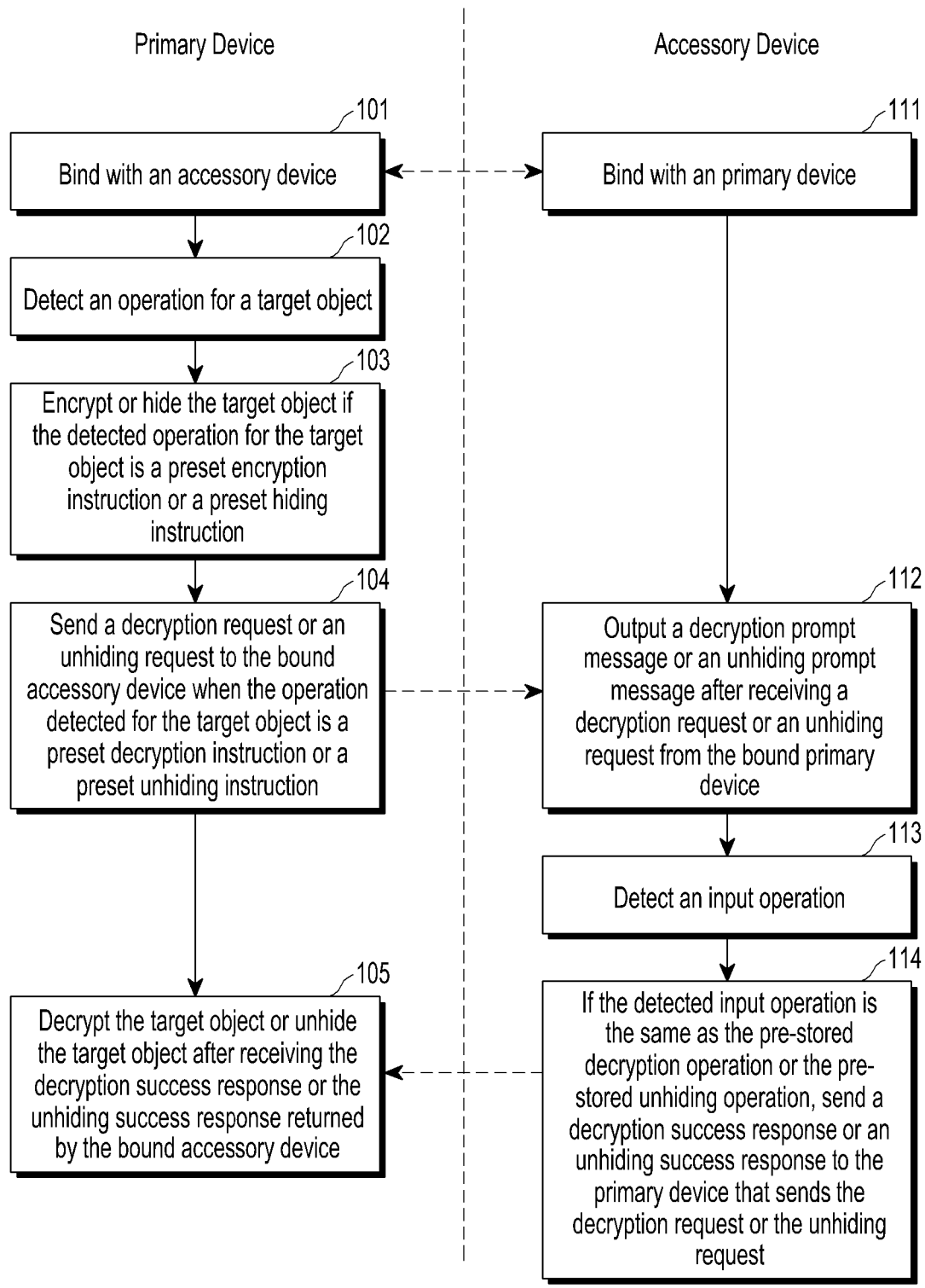
FIG. 1 is a schematic flowchart illustrating an encryption/decryption or a hiding/unhiding process of a primary device and an accessory device according to various embodiments of the present disclosure.

The following description with reference to accompany drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A method for processing operations according to the present disclosure is mainly a method of processing encryption/decryption or hiding/unhiding. A device where a target object requiring encryption/decryption or hiding/unhiding locates is a primary device, and a device that cooperates with the primary device is an accessory device. A target object may be, for example, an application, a page, an image, a contact, information, a video, a file, or even an audio in the device.

The primary device and the accessory device are relative concepts for a certain target object. A same device may be used as a primary device in one scenario and as an accessory device in another scenario. The primary and accessory devices may be referred to as a first device and a second device since they are relative concepts for a certain target object.

Generally, a device where a target object that needs to be encrypted/hidden is located is taken as a primary device. For example, a user has a smartphone and a smartwatch. If a target object (such as a contact) in the smartphone needs to be encrypted/hidden and if the method of the present disclosure is applied to process the target object, the smartphone will be taken as a primary device, and the smartwatch bound with the smartphone will be taken as an accessory device. On the contrary, if a target object (such as a piece of information) in the smartwatch needs to be encrypted/hidden, and if the method of the present disclosure is applied to process the target object, the smartwatch will be taken as a primary device, and the smartphone bound with the smartwatch will be taken as an accessory device.

FIG. 1 is a schematic flowchart illustrating an encryption/decryption or a hiding/unhiding process between a primary device and an accessory device according to various embodiments of the present disclosure.

Referring to FIG. 1, an encryption/decryption or a hiding/unhiding process (referring to a flow on the left of FIG. 1) of the primary device and a decryption/unhiding process (referring to a flow on the right of FIG. 1) of the accessory device cooperated with the primary device will be respectively described below.

Specifically, the encryption/decryption or hiding/unhiding process of the primary device may include the following operations.

Operation 101: Bind with the accessory device. The primary device may bind with at least one accessory device. The number of the accessory devices bound with the primary device may be two or more than two.

In operation 101, the binding with the accessory device may include: pairing, by the primary device with the accessory device though a designated communication protocol, wherein the communication protocol may be, for example, Bluetooth communication protocol. The binding may further include the primary device prompting for an account number and a password of the primary device, and waiting for a user to input the same. The binding may further include the primary device checking the input account number and the input password. The primary device will successfully bind with the accessory device after the checking is successful.

In an embodiment, after the checking is successful, the method may further include prompting for setting a decryption operation or an unhiding operation of the accessory device, receiving an input operation and send the input operation to the bound accessory device, wherein the input operation will be used as a preset decryption operation or a preset unhiding operation of the bound accessory device. The accessory device may receive the input operation instruction sent by the primary device, and configure and store the input operation as a preset decryption operation or a preset unhiding operation of the accessory device.

Certainly, the decryption operation or the unhiding operation of the accessory device can also be set on the accessory device, or can be selected from several default decryption operations or unhiding operations set in advance by the user.

There are many kinds of operations that can be used as the decryption operation or the unhiding operation, for example, a clicking and pressing operation, an audio operation, a gesture operation, an action operation, human face recognition, etc.

Corresponding to the foregoing binding operation, the method of the present disclosure further includes an operation for unbinding, which may specifically include the following operations. The unbinding may include prompting for the account number and the password of the primary device after receiving an instruction for unbinding a designated accessory device. The unbinding may further include checking the input account number and the input password, and remove the binding relationship with the designated accessory device when the checking is successful.

Operation 102: Detect an operation for a target object.

In the present disclosure, the target object may be an application, a page, an image, a contact, information, a video, a file, or even an audio on the primary device.

The detecting of the operation for the target object may include: detecting an operation for some contents of the target object. For example, an encryption instruction or a hiding instruction may refer to encrypting or hiding a video fragment of a video file. More specifically, for example, a video fragment may be selected first, and then an encryption instruction may be produced to encrypt the video fragment selected. Alternatively, an encryption instruction may be provided first, and then a video fragment to be encrypted may be selected, and the video fragment may be encrypted after the selection.

Operation 103: Encrypt or hide the target object if the detected operation for the target object is a preset encryption instruction or a preset hiding instruction. For example, it can be set that long pressing with a single finger on the target object is an encryption instruction. And then, when the primary device detects that an operation of long pressing with a single finger is performed on a target object, the target object should be encrypted.

In an embodiment, in operation 103, the operation of encrypting or hiding the target object may also be: outputting information to be confirmed for encrypting or hiding the target object and waiting for a user to input a confirmation; after the confirmation is received, the target object is then encrypted or hidden. Thereby, interactions and a chance for voluntarily selecting by a user are provided.

In an embodiment, in operation 103, after the target object is encrypted or hidden, the method may further include: the primary device outputs encryption success prompt message or hiding success prompt message to notify the user that an encryption or hiding process succeeds, and sends encryption success notification or hiding success notification to the bound accessory device. After receiving the encryption success notification or the hiding success notification, the bound accessory device may display an encryption success prompt message or a hiding success prompt message on itself, to notify the user that the encryption or hiding process succeeds.

Operation 104: Keep on detecting operations for the target object; send a decryption request or an unhiding request to the bound accessory device when the operation detected for the target object is a preset decryption instruction or a preset unhiding instruction.

In operation 104, if the operation detected for the target object is a preset decryption instruction or a preset unhiding instruction, the method may further include: searching whether there is an accessory device that has a binding relationship with the primary device; if yes, sending a decryption request or an unhiding request to the accessory device. Specifically, the searching operation may refer to searching through the communication protocol used for binding. For example, if the Bluetooth protocol is used for binding, the Bluetooth protocol may also be used here to search for the accessory device bound to the primary device.

With respect to the decryption instruction or the unhiding instruction, for example, that long pressing the target object with two fingers may be set as the decryption instruction or the unhiding instruction. Therefore, when detecting an operation of long pressing with two fingers on a target object, the primary device may send the decryption request or the unhiding request to the bound accessory device.

In an embodiment, in operation 104, that sending a decryption request or an unhiding request to the bound accessory device may include that the primary device outputs information to be confirmed for decrypting or unhiding the target object and waits for a user to input a confirmation. And the primary device may send the decryption request or the unhiding request to the bound accessory device after the confirmation is received. Thereby, interactions and a chance for voluntarily selecting by a user are provided.

The decryption request or the unhiding request sent to the accessory device by the primary device may be a same request, aiming at requesting the accessory device to perform relevant authentication check. Once the authentication check passes, decryption or unhiding may be performed. Similarly, a decryption success response or an unhiding success response returned by the accessory device may be a same success response, aiming at notifying the primary device that "authentication check on the accessory device passes successfully". Once the primary device learns that the authentication check on the accessory device passes successfully, the primary device may perform decryption or unhiding.

Operation 105: Decrypt the target object or unhide the target object after receiving the decryption success response or the unhiding success response returned by the bound accessory device.

In the present disclosure, for different target objects, the method for unhiding the target objects may be different. For example, for an application, a page, an image, a contact, information, a video, and a file, the unhiding method may be re-displaying these target objects. For an audio object, the unhiding method may be re-playing the audio object.

Corresponding to the primary device, as shown in the flow on the right of FIG. 1, a method for decrypting or unhiding of an accessory device cooperated with the primary device may specifically include:

Operation 111: Bind with the primary device. Operation 111 needs to be performed together with operation 101 to implement the binding of the primary device and the accessory device. Please refer to the descriptions of operation 101 which illustrate a specific binding method and embodiments thereof Operation 112: Output a decryption prompt message or an unhiding prompt message after receiving a decryption request or an unhiding request from the bound primary device. Operation 112 corresponds to operation 104. When an operation for a target object detected by the primary device is a preset decryption instruction or a preset unhiding instruction, a decryption request or an unhiding request may be sent to the bound accessory device. After receiving the decryption request or the unhiding request, the accessory device may output a corresponding decryption prompt message or a corresponding unhiding prompt message, to notify the user to perform a decryption operation or an unhiding operation. Certainly, if the default setting is that the user knows the decryption operation or the unhiding operation, the corresponding decryption prompt message or the corresponding unhiding prompt message may not be output.

Operation 113: Detect an input operation. That is, an authentication check process of the accessory device starts. If it is detected that the input operation of the user is the same as a pre-stored decryption operation or a pre-stored unhiding operation, the authentication check succeeds, otherwise, the authentication check fails.

Operation 114: If the detected input operation is the same as the pre-stored decryption operation or the pre-stored unhiding operation, send a decryption success response or an unhiding success response to the primary device that sends the decryption request or the unhiding request, otherwise, returning no response or return a failure response. Operation 114 corresponds to operation 105 of the primary device. When receiving the decryption success response or the unhiding success response returned by the bound accessory device, the primary device may decrypt the target object or unhide the target object. If the primary device does not receive any response or receives the failure response, the primary device may not perform a decryption or unhiding operation.

If the input operation detected by the accessory device is different from the pre-stored decryption operation or the pre-stored unhiding operation, it is determined that the decryption operation or the unhiding operation does not succeed, and a decryption failure response or an unhiding failure response may be sent to the primary device that sends the decryption request or the unhiding request. Alternatively, the user may be notified to repeatedly input the decryption operation or the unhiding operation until the times of input failures reach a designated number. In this case, a decryption failure response or an unhiding failure response may then be sent to the primary device that sends the decryption request or the unhiding request.

Corresponding to the method, the present disclosure also discloses a corresponding primary device and a corresponding accessory device.

Figure 2:
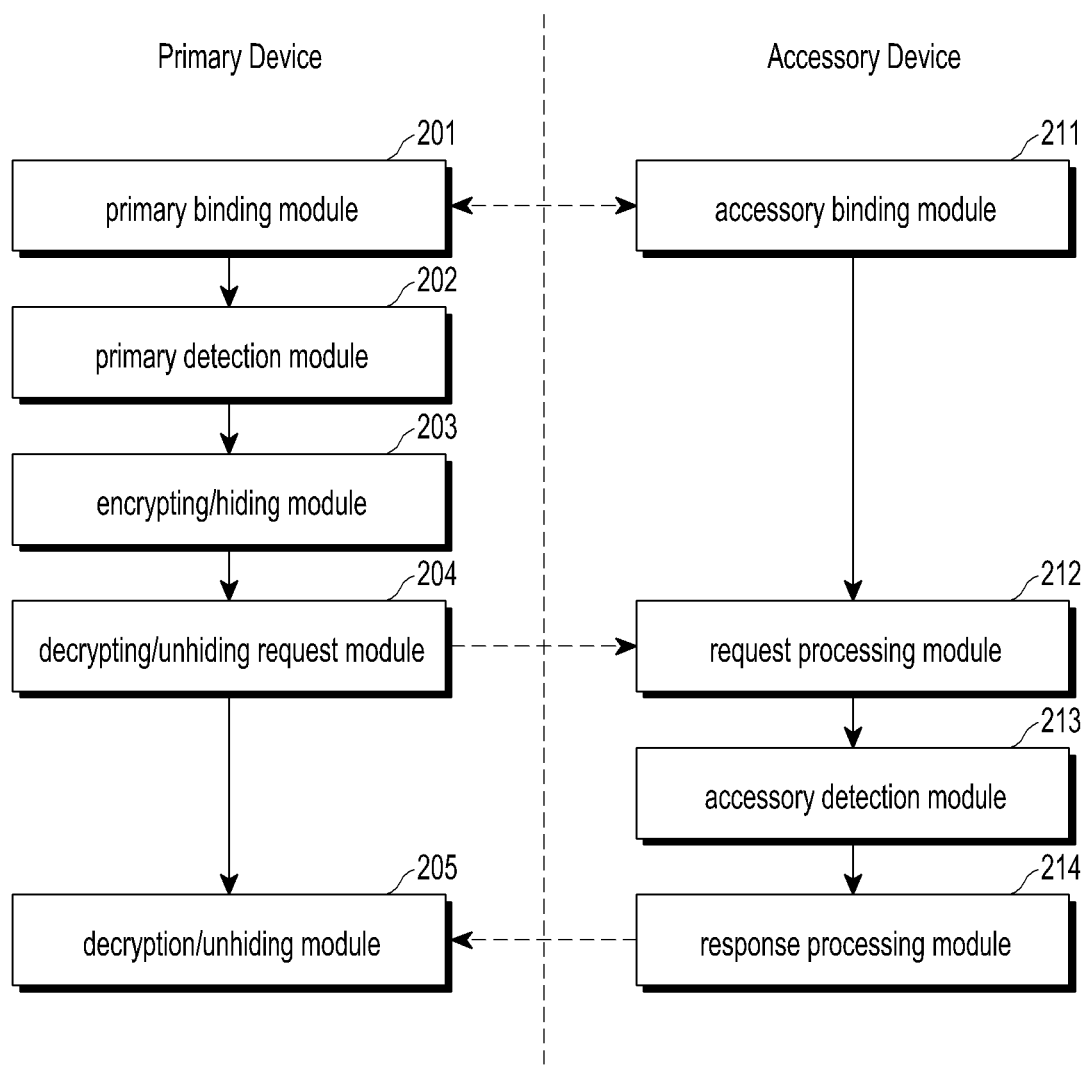
FIG. 2 is a schematic diagram illustrating the structure of a primary device apparatus and an accessory device apparatus according to various embodiments of the present disclosure.

FIG. 2 is a schematic diagram illustrating the composition of the primary device apparatus and the accessory device apparatus according to various embodiments of the present disclosure. The primary device apparatus is installed on the primary device and is used to perform the processing method for encrypting/decrypting or hiding/unhiding the primary device in any one of the foregoing embodiments. The accessory device apparatus is installed on the accessory device and is used to perform the processing method for decrypting or unhiding the accessory device in any one of the foregoing embodiments. Furthermore, for convenience, the primary device apparatus will be described according to modules for performing particular functionality. It will be appreciated that each of these modules, or any combination of these modules, may be implemented in one or more processors executing corresponding executable program instructions.

Referring to FIG. 2, modules of the primary device apparatus may include a primary binding module 201, configured to bind with an accessory device, a primary detection module 202, configured to detect an operation instruction for a target object, an encrypting/hiding module 203, configured to determine whether the operation instruction detected by the primary detection module is a preset encryption instruction or a preset hiding instruction; and if yes, encrypt or hide the target object, a decrypting/unhiding request module 204, configured to determine whether the operation instruction detected by the primary detection module is a preset decryption instruction or a preset unhiding instruction; and if yes, send a decryption request or an unhiding request to the bound accessory device, and a decryption/unhiding module 205, configured to receive a response returned by the bound accessory device, and decrypt the target object or unhide the target object after receiving a decryption success response or an unhiding success response returned by the bound accessory device.

Referring to FIG. 2, the accessory device apparatus may mainly include an accessory binding module 211, configured to bind with the primary device, a request processing module 212, configured to receive a request from the bound primary device, and output a decryption prompt message or an unhiding prompt message after receiving a decryption request or an unhiding request of the bound primary device, an accessory detection module 213, configured to detect an input operation, and a response processing module 214, configured to determine whether the input operation detected by the accessory detection module is the same as a pre-stored decryption operation or a pre-stored unhiding operation, and if yes, send a decryption success response or an unhiding success response to the primary device that sends the decryption request or the unhiding request.

The primary device apparatus may be installed on the primary device, and the accessory device apparatus may be installed on a secondary device. However, the primary device and the accessory device are relative concepts for a target object, and the primary device apparatus and the accessory device apparatus may be installed on a same device simultaneously. A device may be used as the primary device or the accessory device.

Modules in the above apparatus embodiment are divided according to the processing flow. In the present disclosure, units and modules of the device may also be divided according to functions, so as to establish a processing system to implement objectives of the present disclosure.

Figure 3:
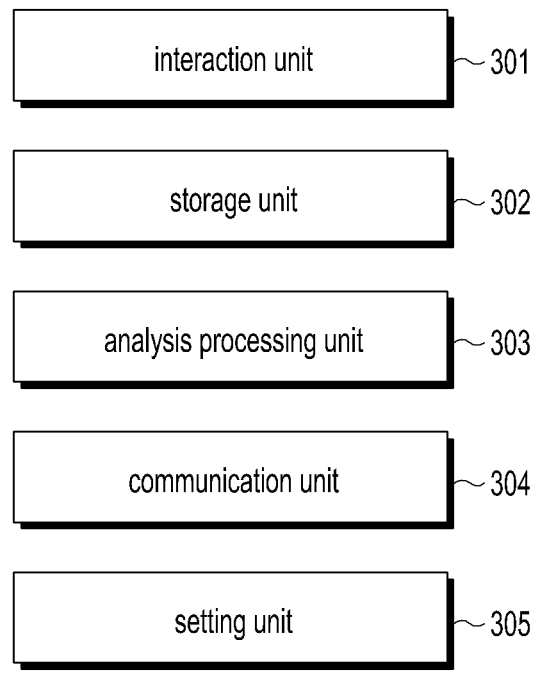
FIG. 3 is a schematic diagram illustrating functional modules included according to various embodiments the present disclosure.

FIG. 3 is a schematic diagram of functional units included in the present disclosure.

Referring to FIG. 3, functional units mainly included in the present disclosure are as follows: an interaction unit 301 (e.g., a touchscreen), a storage unit 302 (i.e., a memory), an analysis processing unit (i.e., a processor) 303, a communication unit (i.e., a transceiver) 304, and a setting unit.

The functional units will be introduced in detail below.

I. The interaction unit 301. The interaction unit 301 is used to identify various interactions which may trigger a device to produce an encryption/decryption or hiding/unhiding instruction, and to record user information through operations of the user. The main interactions are as follows.

1) Prompt a dialog box, which includes prompting a confirmation dialog box of a user instruction, prompting a success message on the screen when the encryption/decryption/hiding/unhiding process succeeds, and prompting help information relevant to the decryption/unhiding process.

2) Identification of interactions. Interactions that can be identified may include a trigger operation complying with preset conditions such as voices, gestures, actions, or human face recognition.

II. The storage unit 302. The storage unit 302 is mainly used to store information of operations.

Figure 4:
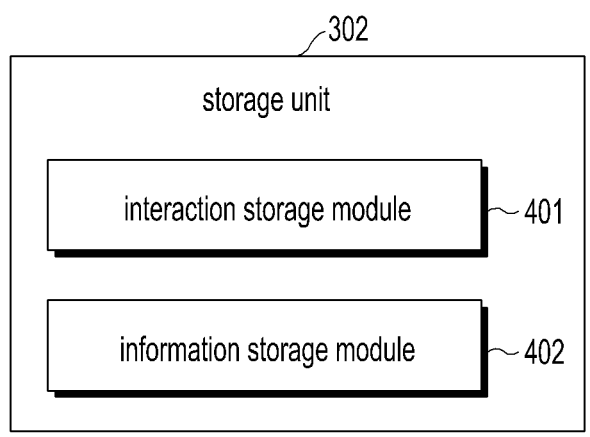
FIG. 4 is a schematic diagram of a storage unit according to various embodiments of the present disclosure.

FIG. 4 is a schematic diagram illustrating the storage unit 302 according to various embodiments of the present disclosure. The storage unit 302 may include the following modules.

1) An interaction storage module 401. The interaction storage module 401 may be configured on the primary device and the accessory device, and may be used to store interactions which trigger the encryption/decryption or hiding/unhiding instructions on the primary device and the accessory device. Wherein, the encryption/decryption or hiding/unhiding instructions may be preset by the user.

2) An information storage module 402. The information storage module 402 may be configured on the primary device and may be used to store information of the encrypted or hidden content. The information of the encrypted or hidden content may be stored in the storage unit 302. When a decryption or an unhiding operation needs to be performed, the system may query an interaction corresponding to the operations stored in the storage unit 302 and performs a subsequent operation according to the query result.

III. The analysis processing unit 303. The analysis processing unit 303 is mainly used to collect interactions and match the interaction identified by the interaction unit with the preset interactions stored in the storage unit 302. And if they are matched, trigger a corresponding instruction and perform a relevant operation.

Figure 5:
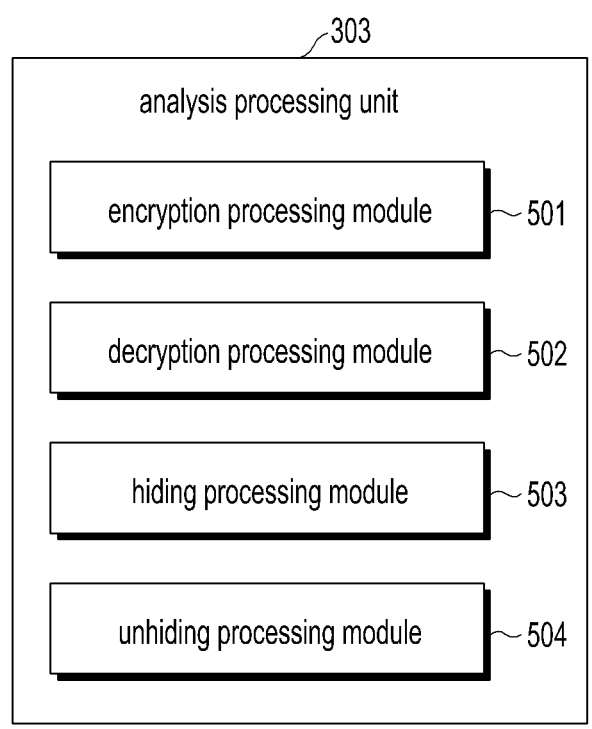
FIG. 5 is a schematic diagram of an analysis processing unit according to various embodiments of the present disclosure.

FIG. 5 is a schematic diagram illustrating an analysis processing unit 303 according to various embodiments of the present disclosure. The analysis processing unit 303 mainly includes the following modules.

1) An encryption processing module 501. The encryption processing module 501 may be configured to collect and process an interaction which matches a preset encryption instruction. If an interaction method matches a preset encryption instruction, the primary device may perform an encryption procedure on a current object, and send an encryption notification to the accessory device.

2) A decryption processing module 502. The decryption processing module 502 may be configured to collect and process an interaction which matches a preset decryption instruction. If an interaction matches a preset decryption instruction, the primary device may send a decryption request to the accessory device. And after the accessory device returns a decryption success response, the primary device may decrypt the encrypted target object.

3) A hiding processing module 503. The hiding processing module 503 may be configured to collect and process an interaction which matches a preset hiding instruction. If an interaction matches a preset hiding instruction, the primary device may perform a hiding process on a current object, and sends a hiding notification to the accessory device.

4) An unhiding processing module 504. The unhiding processing module 504 may be configured to collect and process an interaction which matches a preset unhiding instruction. If an interaction matches a preset unhiding instruction, the primary device may send an unhiding request to the accessory device. And after the accessory device returns an unhiding success response, the primary device may display a hidden object.

IV. The communication unit 304. The communication unit 304 is mainly used for implementing communications and information transmissions between the primary device and the accessory device and performing a real-time detection on the state of the communication. When the primary device sends a decryption/unhiding instruction, the system may automatically search for the bound accessory device and sends a corresponding decryption/unhiding request to the bound accessory device.

V. The setting unit 305. The setting unit 305 is used for implementing pairing and binding between the primary device and the accessory device. And the setting unit 305 is also used for setting encryption/decryption interactions between the primary device and the accessory device. Specifically, the setting unit 305 is mainly used for:

1) Initial pairing. In initial pairing, it is set that the binding between the primary device and the accessory device is performed via a designated communication protocol (for example, a Bluetooth protocol). Wherein, the binding relationship between the primary device and the accessory device is not unique. Multiple accessory devices may be bound with a same primary device. And there are no priorities of these accessory devices.

2) Re-binding. If the accessory device is lost or damaged after the primary device encrypted a target object, the primary device needs to bind with a new accessory device to reset the encryption/decryption methods. When an unbinding process is performed, an account number and a password of the primary device should be input to reset the accessory device. And after the accessory device is reset, the content of the primary device may be automatically decrypted, and then be re-encrypted by a new accessory device.

3) Setting of an encryption/decryption interaction. After the primary device and the accessory device are bound, a user may set an operation instruction of an encryption/decryption instruction. Wherein, the interaction of the operation instruction may include any triggering operation suitable for the current scenario, such as voices, gestures, actions, human face recognition and etc.

Figure 6:
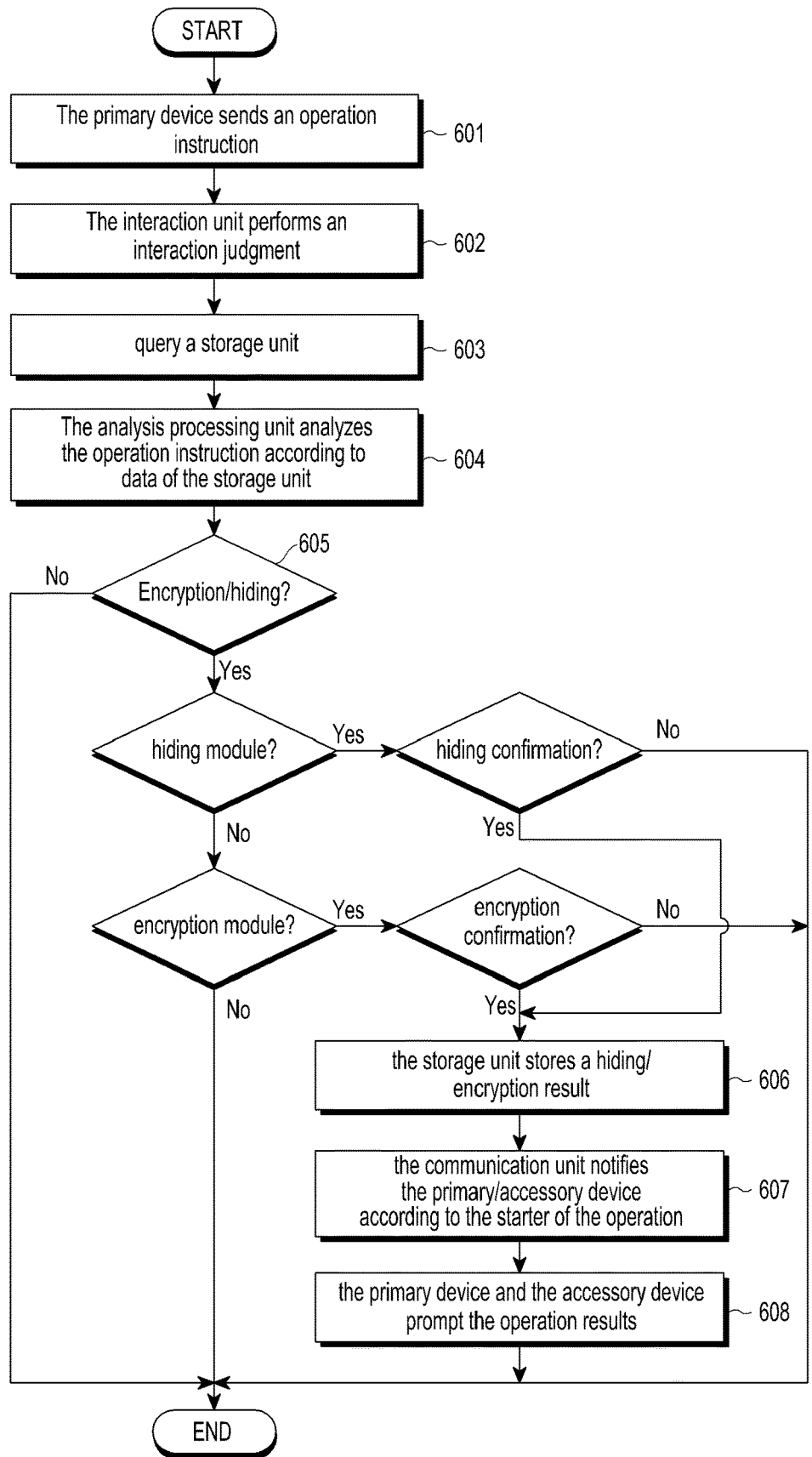
FIG. 6 is a schematic flowchart illustrating another encryption/hiding process of a system according to various embodiments of the present disclosure.

FIG. 6 is another flowchart illustrating the encryption/hiding procedure of the system according to various embodiments of the present disclosure. The flow is described by referring to the foregoing functional units and modules.

Referring to FIG. 6, the encryption/hiding process may include the following operations.

Operation 601: A primary device sends an operation instruction.

Operation 602: An interaction unit, e.g., interaction unit 301, performs a relevant interaction judgment.

Operation 603: The system queries an interaction storage module, e.g., interaction storage module 401, of a storage unit, e.g., storage unit 302, and compares the operation instruction with the preset corresponding interactions.

Operation 604: The analysis processing unit, e.g., analysis processing unit 303, analyzes the operation instruction according to data of the storage unit 302.

Operation 605: If the operation instruction matches an encryption/hiding instruction, determining whether the operation instruction is an encryption instruction or a hiding instruction.

Operation 606: After confirmation, the storage unit stores a hiding/encryption result of the primary device.

Operation 607: After storage of the hiding/encryption result, the communication unit notifies the accessory device of the result.

Operation 608: operation results are prompted on both the primary device and the accessory device.

Figure 7:
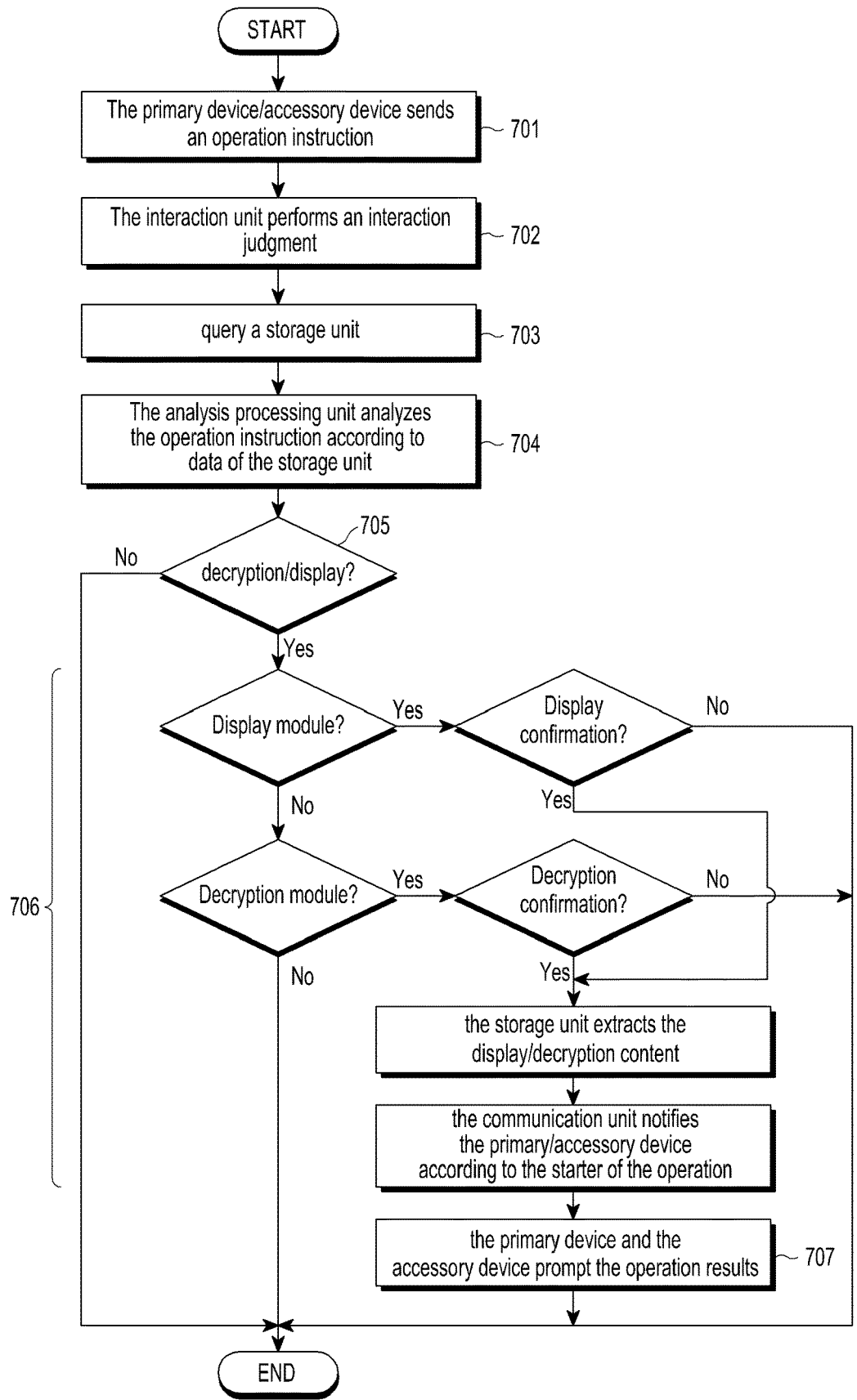
FIG. 7 is a schematic flowchart illustrating another decryption/unhiding process of a system according to various embodiments of the present disclosure.

FIG. 7 is another flowchart illustrating a decryption/unhiding process of a system according to various embodiments of the present disclosure. The flow is described by referring to the foregoing functional units and modules.

Referring to FIG. 7, the decryption/unhiding process may include the following operations.

Operation 701: The primary device sends an operation instruction.

Operation 702: The interaction unit performs a relevant interaction judgment.

Operation 703: The system queries the interaction storage module of a storage unit, and compares the operation instruction with preset corresponding interactions.

Operation 704: The analysis processing unit analyzes the operation instruction according to data of the storage unit.

Operation 705: If the operation instruction matches a decryption/unhiding instruction, determining whether the operation instruction is a decryption instruction or an unhiding instruction.

Operation 706: a decryption/unhiding confirmation process is performed on the accessory device. That is, the accessory device detects an input operation. If the detected input operation is the same as a preset decryption operation or a preset unhiding operation, the accessory device may send a decryption success response or an unhiding success response to the primary device that sends the decryption request or the unhiding request. And after receiving the decryption success response or the unhiding success response, the primary device may display the hidden/encrypted content extracted from the storage unit.

Operation 707: Operation result are prompted on both the primary device and the accessory device.

In the following, embodiments of the methods and apparatus of the present disclosure may be described in more details. In the following embodiments, a smartphone is used as a primary device, and a smartwatch is used as an accessory device. Moreover, the primary device and the accessory device are already bound. In the following embodiments, different encryption/decryption or hiding/unhiding operations with respect to different target objects are described.

Embodiment 1: Encryption and Decryption of an Application

Figure 8A:
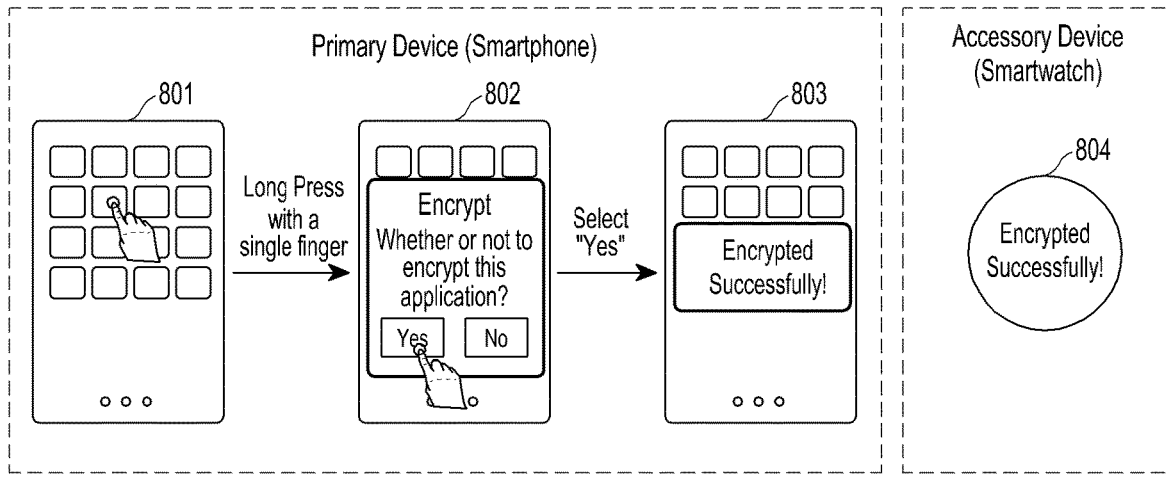
FIG. 8A is a schematic diagram illustrating an encryption process of an application according to various embodiments of the present disclosure.

FIG. 8A is a schematic diagram illustrating an encryption process of an application according to various embodiments of the present disclosure.

Figure 8B:
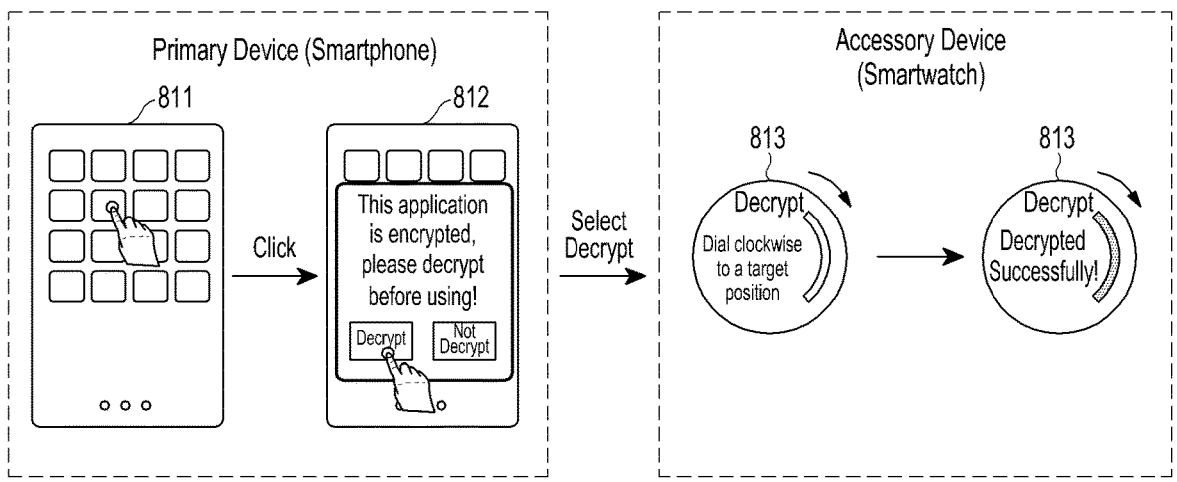
FIG. 8B is a schematic diagram illustrating a decryption process corresponding to FIG. 8A according to various embodiments of the present disclosure.

FIG. 8B is a schematic diagram illustrating a decryption process corresponding to FIG. 8A according to various embodiments of the present disclosure. This embodiment may include the following operations.

Referring to FIG. 8A, an encryption process may include:

Operation 801: An operation of long pressing with a single finger (pressed for a long time) is performed on an application icon on the interface of the primary device. The operation of long pressing with a single finger is an encryption instruction of an application indicated by the application icon of this embodiment.

Operation 802: An encryption confirmation dialog box is popped up on the interface of the primary device. And then a user selects "Yes".

Operation 803: The primary device performs an encryption operation on the application. Then encryption success prompt messages are displayed on both the primary device and the accessory device. During this procedure, communications between the primary device and the accessory device are needed. Specifically, after the encryption process, the primary device needs to notify the accessory device. Then the accessory device may display a notification of "Encrypted Successfully!" (operation 804). Alternatively, after the encryption, the primary device may not notify the accessory device, thus the accessory device may not display an encryption success prompt.

Referring to FIG. 8B, a decryption process may include:

Operation 811: Click the application icon of an encrypted application on the interface of the primary device.

Operation 812: Because the application has already been encrypted, a prompt box showing that decryption is needed is popped up on the interface of the primary device. And then the user confirms. The primary device automatically searches whether there is a bound accessory device around. If there is a bound accessory device around, the primary device sends a decryption request to the accessory device. And after receiving the decryption request, the accessory device may automatically pop up a decryption interface. As shown in FIG. 8B, on the decryption interface a prompt message of the decryption operation is displayed, for example, a message of "Dial clockwise to a target position" is displayed. Wherein, the operation of "Dial clockwise to a target position" is a decryption operation. The "dial operation" may be an operation of turning a dial with a finger on the interface of the accessory device. Alternatively, to further improve the security, the prompt message of the decryption operation may not be displayed in a case a user knows the decryption operation in advance.

Operation 813: The user performs a dial operation on the decryption interface according to the prompt message, that is, perform an operation of "Dial clockwise to a target position". If the accessory device determines that operation input by the user is the same as the decryption operation, the decryption process succeeds, and a decryption success response is then returned to the primary device. After receiving the decryption success response, the primary device may decrypt the application. In this way, the application may be started normally.

Embodiment 2: Encryption and Decryption of an Image

Figure 9A:
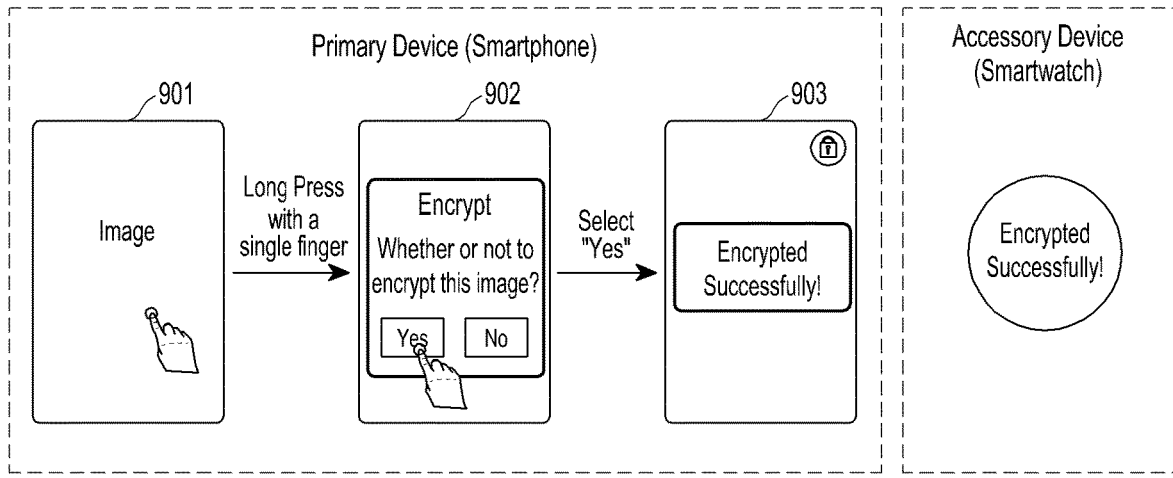
FIG. 9A is a schematic diagram illustrating an encryption process of an image according to various embodiments of the present disclosure.
Figure 9B:
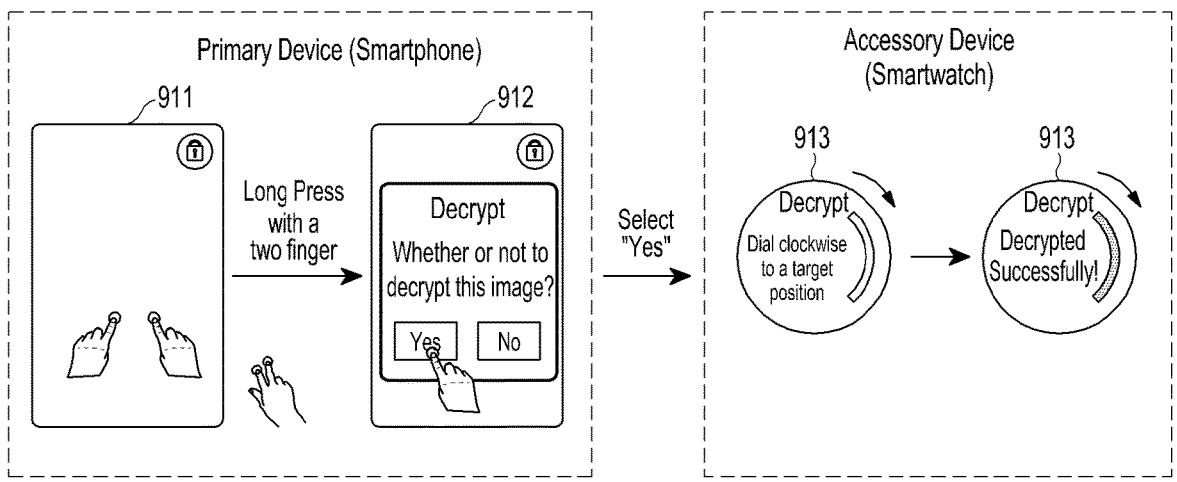
FIG. 9B is a schematic diagram illustrating a decryption process corresponding to FIG. 9A according to various embodiments of the present disclosure.

FIG. 9A is a schematic diagram illustrating an encryption process of an image according to various embodiments of the present disclosure. And FIG. 9B is a schematic diagram illustrating a decryption process corresponding to FIG. 9A. This embodiment may include the following operations.

Referring to FIG. 9A, an encryption process of an image may include:

Operation 901: An operation of long pressing with a single finger is performed on an image displayed by the primary device. The operation of long pressing with a single finger is an encryption instruction of an image.

Operation 902: An encryption confirmation dialog box is popped up on the interface of primary device. And then a user selects "Yes".

Operation 903: The primary device performs an encryption operation on the image and sends an encryption success notification to the accessory device. Then encryption success prompt messages are displayed on both the primary device and the accessory device.

Referring to FIG. 9B, a decryption process of an image may include:

Operation 911: An operation of long pressing with two fingers (one hand or two hands) is performed on an image to be decrypted on the primary device. Here, the operation of long pressing with two fingers is a preset decryption instruction on the primary device.

Operation 912: A decryption confirmation dialog box is popped up on the interface of the primary device. And then the user selects "Yes". The primary device automatically searches whether there is an accessory device bound to the primary device around. If there is an accessory device bound to the primary device, the primary device sends a decryption request to the accessory device.

Operation 913: After receiving the decryption request, the accessory device automatically pops up a decryption interface. And a prompt message of the decryption operation, for example, a message of "Dial clockwise to a target position" is displayed on the decryption interface. Wherein, the operation of "Dial clockwise to a target position" is a decryption operation. Alternatively, to further improve the security, the prompt information of the decryption operation may not be displayed in case that a user knows the decryption operation in advance. The user performs a dial operation on the decryption interface according to the prompt information. That is, perform an operation of "Dial clockwise to a target position". If the accessory device determines that the operation input by the user is the same as the decryption operation, the decryption process succeeds, and a decryption success response is returned to the primary device. And after receiving the decryption success response, the primary device decrypts the image, that is, displays the image.

Embodiment 3: Hiding and Unhiding of a Current Page

Figure 10A:
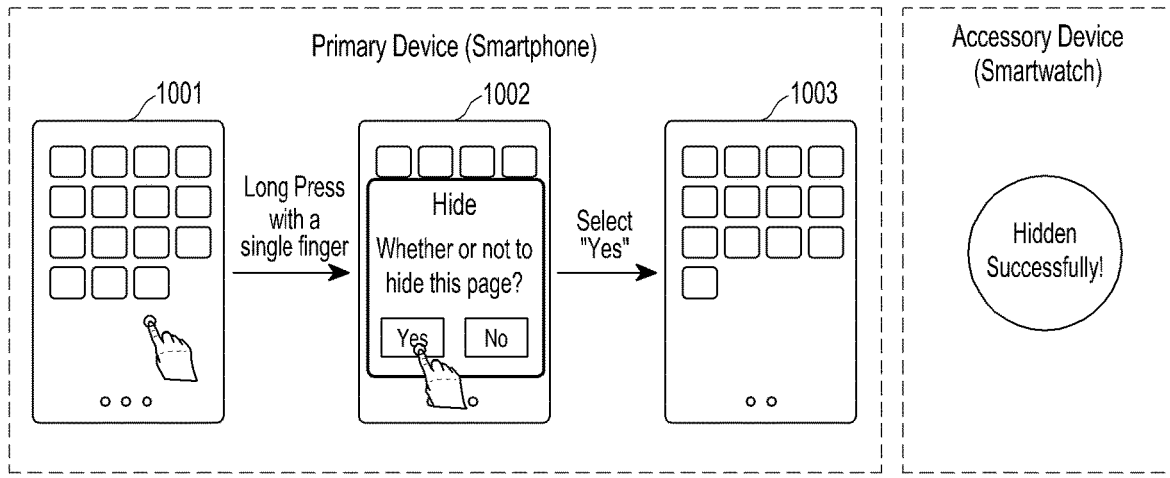
FIG. 10A is a schematic diagram illustrating a hiding process of a current page according to various embodiments of the present disclosure.
Figure 10B:
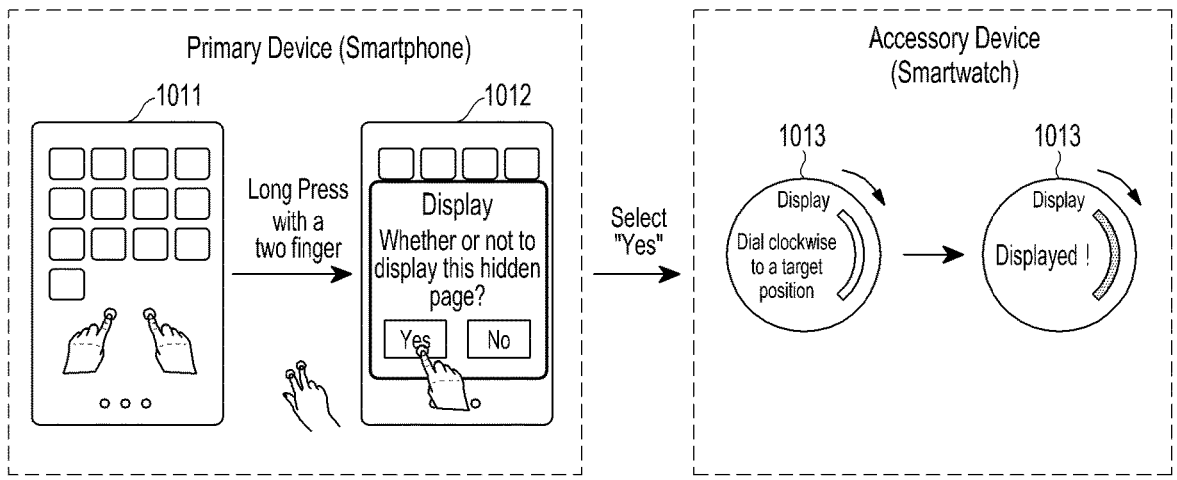
FIG. 10B is a schematic diagram illustrating an unhiding process corresponding to FIG. 10A according to various embodiments of the present disclosure.

FIG. 10A is a schematic diagram illustrating a hiding process of a current page, and FIG. 10B is a schematic diagram illustrating an unhiding process corresponding to FIG. 10A. This embodiment may include the following operations.

Referring to FIG. 10A, a process of hiding the current page may include:

Operation 1001: An operation of long pressing with a single finger is performed on a blank area on the current page displayed by the primary device. The operation of long pressing with a single finger on a blank area on the current page is a preset hiding instruction of a page of the primary device.

Operation 1002: The primary device pops up a hiding confirmation window. And a user selects "Yes".

Operation 1003: The current page of the primary device is hidden. A previous/former page is displayed. And the primary device notifies the bound accessory device, and then the accessory device displays a hiding success prompt message.

Referring to FIG. 10B, a process of unhiding a page (that is re-displaying a hidden page, and in the figure, "unhidden" is represented by "display") may include:

Operation 1011: An operation of long pressing with two fingers (one hand or two hands) is performed on a blank area on the current page displayed by the primary device. Wherein, the operation of long pressing with two fingers on a blank area of the current page is a preset instruction for unhiding a hidden page on the primary device.

Operation 1012: The primary device pops up a display confirmation window. And the user selects "Yes". The primary device automatically searches whether there is an accessory device bound to the primary device. If there is an accessory device bound to the primary device, the primary device sends an unhiding request to the accessory device.

Operation 1013: Then an unhiding interface is automatically popped up on the interface of the accessory device. And a prompt message of the decryption operation, for example, a message of "Dial clockwise to a target position" is displayed on the unhiding interface. Wherein, the operation of "Dial clockwise to a target position" is a decryption operation. The user performs a dial operation on the decryption interface according to the prompt message, that is, perform an operation of "Dial clockwise to a target position". If the accessory device determines that an operation input by the user is the same as the decryption operation, the decryption process succeeds, and a decryption success response is returned to the primary device. After receiving the decryption success response, the primary device unhides the hidden page, that is, displays the hidden page.

Embodiment 4: Hiding/Unhiding of a Contact

Figure 11A:
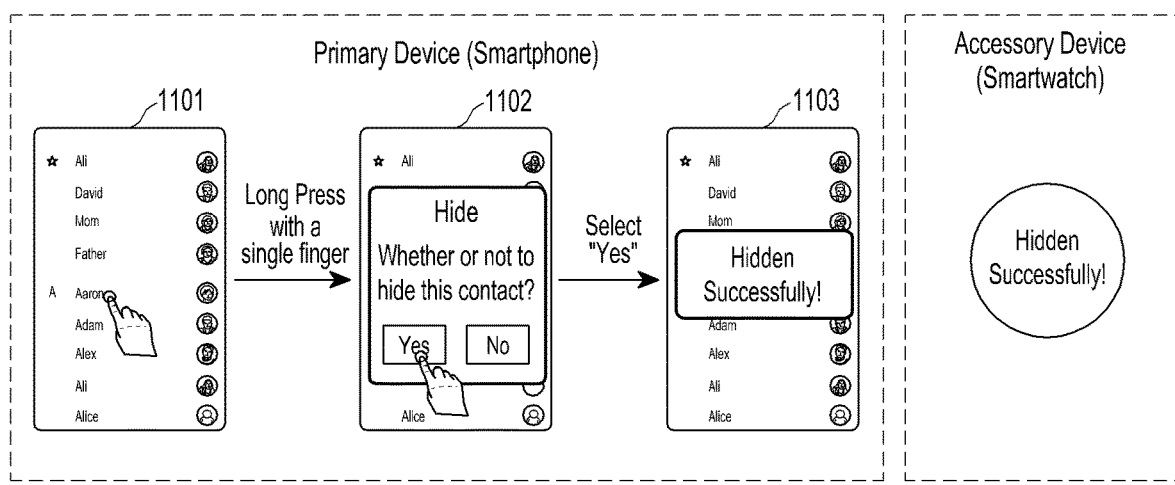
FIG. 11A is a schematic diagram illustrating a hiding process of a contact according to various embodiments of the present disclosure.

FIG. 11A is a schematic diagram illustrating a hiding process of a contact according to various embodiments of the present disclosure.

Figure 11B:
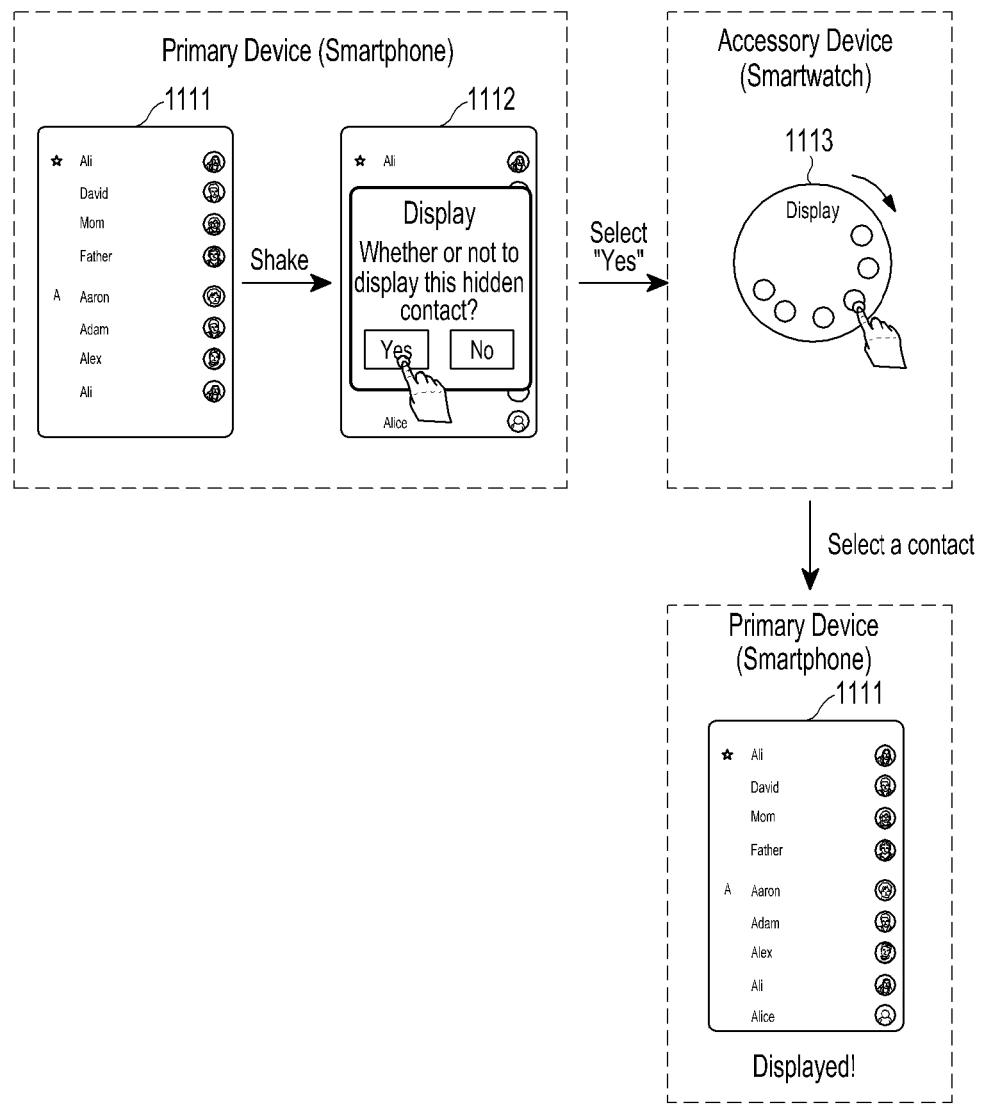
FIG. 11B is a schematic diagram illustrating an unhiding process corresponding to FIG. 11A according to various embodiments of the present disclosure.

FIG. 11B is a schematic diagram illustrating an unhiding process corresponding to FIG. 11A according to various embodiments of the present disclosure. This embodiment may include the following operations:

Referring to FIG. 11A, a process of hiding the contact may include:

Operation 1101: An operation of long pressing is performed on a contact on a contact page of the primary device. Wherein, the operation of long pressing on a contact is a hiding instruction for the contact.

Operation 1102: The primary device pops up a hiding confirmation window. And the user selects "Yes".

Operation 1103: The primary device hides the contact and sends a hiding success notification to the accessory device. And then hiding success prompt messages are displayed on both the primary device and the accessory device.

Referring to FIG. 11B, a process of unhiding a contact may include:

Operation 1111: Shake the primary device while the primary device displays a contact interface. Wherein, the operation of shaking the device is an instruction of unhiding a hidden contact.

Operation 1112: The primary device pops up a hiding confirmation window, for example, as shown in the figure, in the window, a message of "Whether or not to display a hidden contact?" is displayed. And the user selects "Yes". The primary device automatically searches whether there is an accessory device bound to the primary device around. If there is an accessory device bound to the primary device, the primary device sends an unhiding request and the hidden contact information to the accessory device.

Operation 1113: Then the accessory device may display all the hidden contacts. A user performs a selecting operation on the dial of the accessory device, wherein the selecting operation is also a decryption operation. If the accessory device determines that the operation input by the user is the same as the decryption operation, the decryption process succeeds, and a decryption success response may be returned to the primary device. After receiving the decryption success response, the primary device may unhide the selected contact, and re-display the selected contact.

Further, the interaction experience of the present disclosure may be further humanized. For example, when the primary device displays a page, if the current page has some hidden content, a prompt message will be provided on the accessory device. The user may perform on the accessory device, and select the hidden information. Then the hidden information will be displayed on the primary device.

Figure 11C:
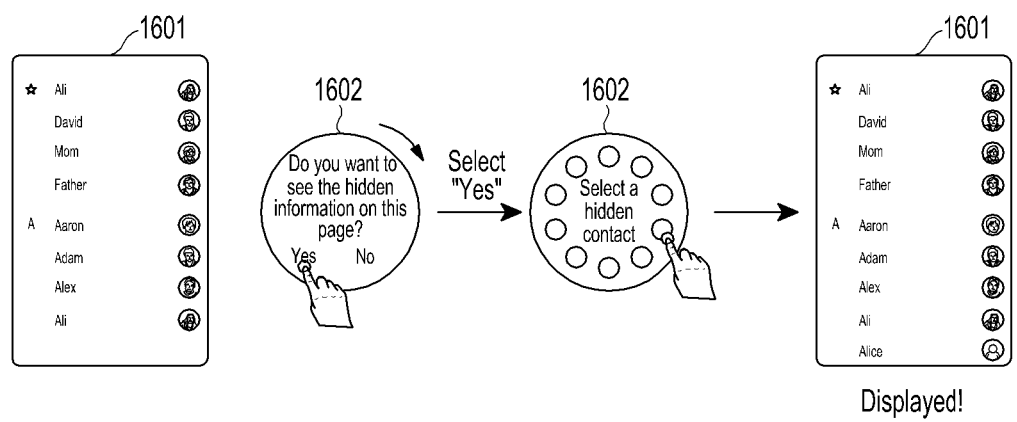
FIG. 11C is a schematic diagram illustrating interfaces for unhiding a contact according to various embodiments of the present disclosure.

FIG. 11C is a schematic diagram illustrating an interaction interface for unhiding a contact.

Referring to FIG. 11C, when the primary device 1601 of the user displays a contact page, which has some hidden contacts on it, the accessory device 1602 will pop up a prompt message "Do you want to see the hidden information on this page?" If the user clicks "Yes", the accessory device may send an unhiding request to a bound primary device 1601. And meanwhile, the primary device may send the hidden contact information to the accessory device 1602. Then the accessory device 1602 may provide a text prompt that notifies the user that there is a hidden contact and queries the user to check. And the accessory device may display summary (names) of the hidden contacts for the user to select. If the user selects a contact, the accessory device 1602 may carry a name of the contact in an unhiding success response returned to the primary device 1601. After receiving the unhiding success response, the primary device 1601 may display the hidden information corresponding to the contact carried in the response.

Embodiment 5: Hiding/Unhiding of Information (Such as a Short Message or a Chatting Record of a Chatting Application)

Figure 12A:
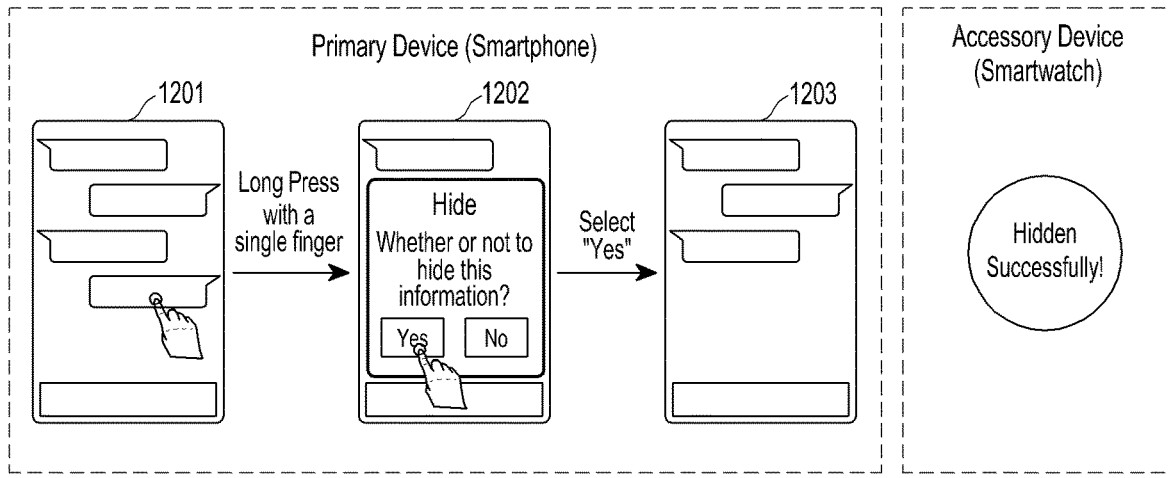
FIG. 12A is a schematic diagram illustrating a hiding process of information according to various embodiments of the present disclosure.

FIG. 12A is a schematic diagram illustrating a hiding process of information according to various embodiments of the present disclosure.

Figure 12B:
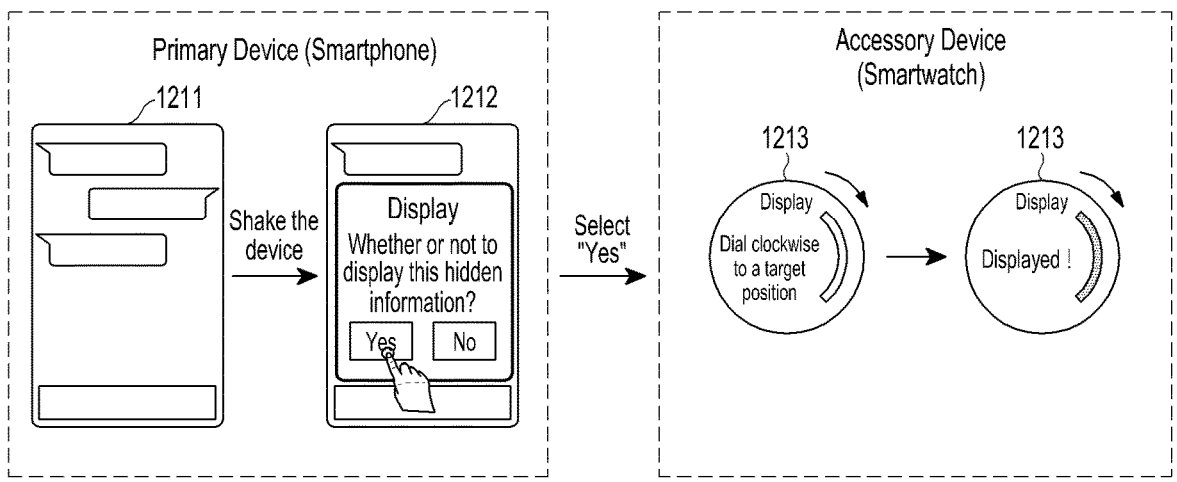
FIG. 12B is a schematic diagram illustrating an unhiding process corresponding to FIG. 12A according to various embodiments of the present disclosure.

FIG. 12B is a schematic diagram illustrating an unhiding process corresponding to FIG. 12A according to various embodiments of the present disclosure. This embodiment may include the following operations.

Referring to FIG. 12A, a process of hiding the information may include:

Operation 1201: A user opens a chatting interface on a primary device, and long presses a piece of chatting contents with a single finger. Wherein, the operation of long pressing a piece of chatting contents with a single finger is a hiding instruction.

Operation 1202: The primary device pops up a hiding confirmation window. And the user selects "Yes".

Operation 1203: The primary device hides the information and sends a hiding success notification to the accessory device. And hiding success prompt messages will be displayed on both the primary device and the accessory device.

Referring to FIG. 12B, a process of unhiding the information may include:

Operation 1211: Shake the primary device while the primary device displays an information page. Wherein, an operation of shaking a device while the device displays an information page is an instruction for unhiding the hidden information on the current page.

Operation 1212: The primary device pops up an unhiding confirmation window, for example, as shown in the figure, in the window, a message of "Whether or not to display the hidden information?" is displayed. And the user selects "Yes". The primary device automatically searches whether there is an accessory device bound to the primary device. If there is an accessory device bound to the primary device, the primary device may send an unhiding request to the accessory device.

Operation 1213: After receiving the unhiding request, the accessory device automatically pops up an unhiding interface, and on the unhiding interface displays a prompt message of the unhiding operation, for example, "Dial clockwise to a target position". Wherein, the operation of "Dial clockwise to a target position" is an unhiding operation. Alternatively, the prompt message may not be displayed in case that the user knows the unhiding operation. The user performs the dial operation on the unhiding interface according to the prompt message, that is, perform an operation of "Dial clockwise to a target position". If the accessory device determines that an operation input by the user is the same as the unhiding operation, the unhiding process succeeds, and an unhiding success response is returned to the primary device.

After receiving the unhiding success response, the primary device may unhide the hidden information, that is, display the hidden page.

Embodiment 6: Hiding/Unhiding of a Video Fragment

Figure 13A:
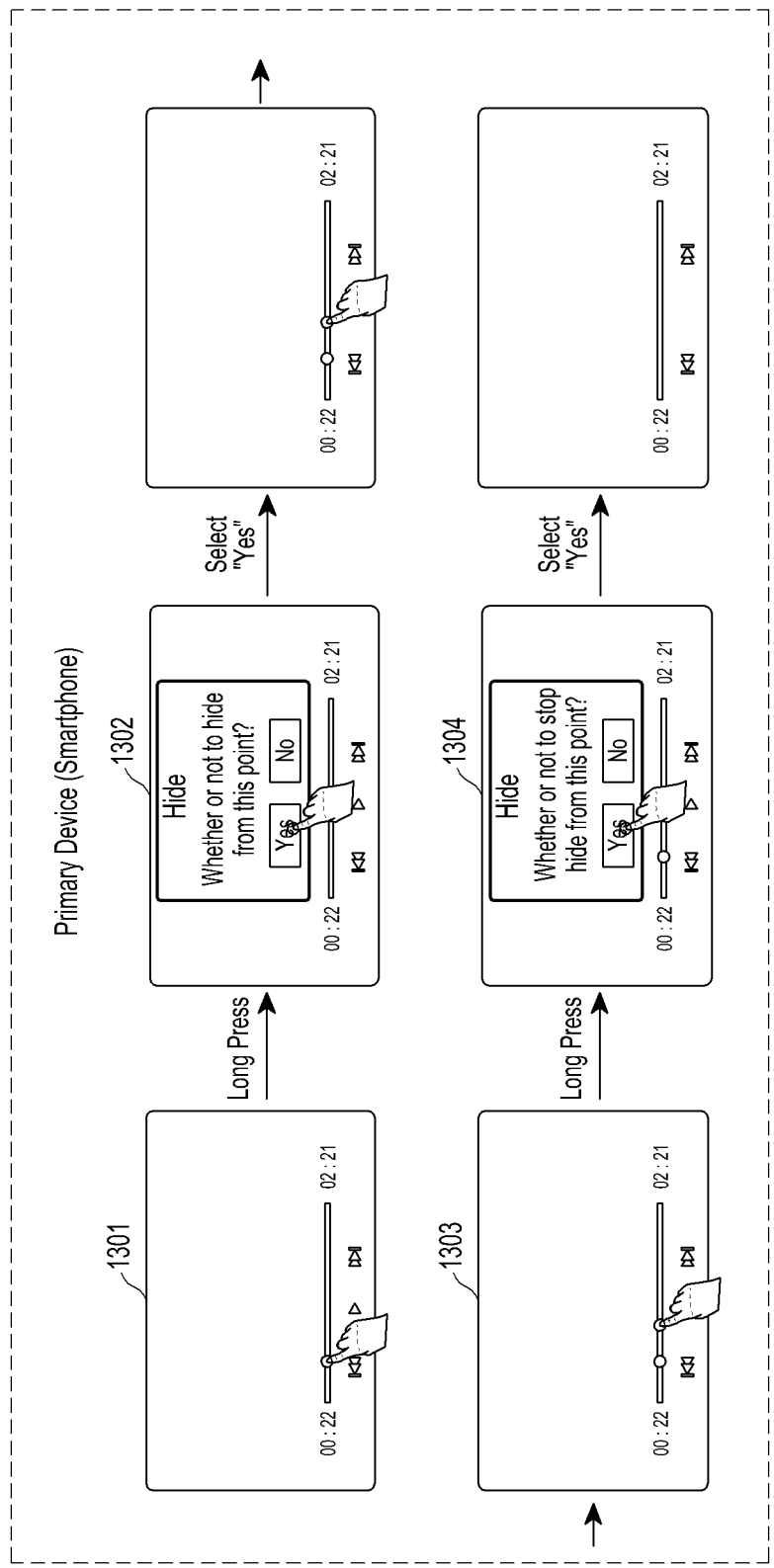
FIG. 13A is a schematic diagram illustrating a hiding process of a video fragment according to various embodiments of the present disclosure.

FIG. 13A is a schematic diagram illustrating a hiding process of a video fragment according to various embodiments of the present disclosure.

Figure 13B:
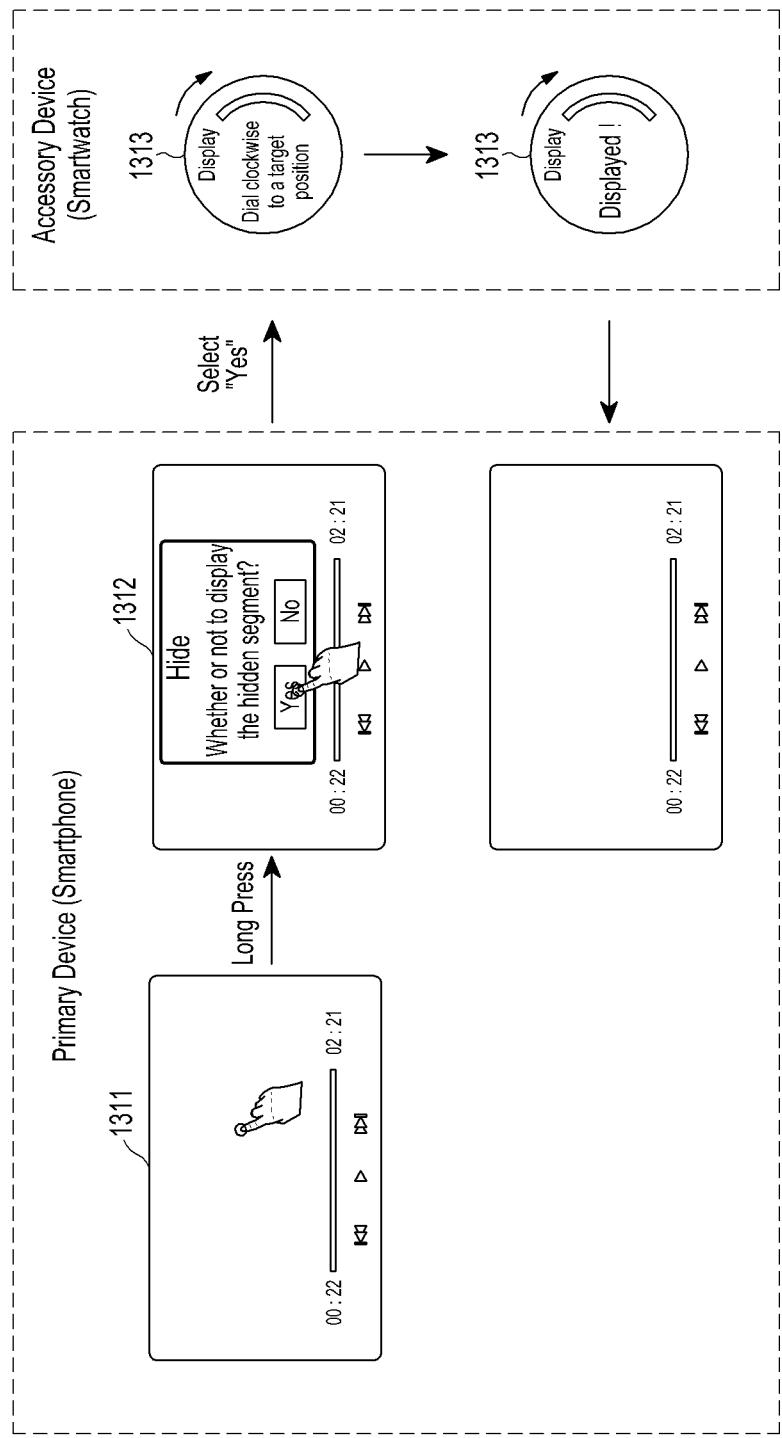
FIG. 13B is a schematic diagram illustrating an unhiding process corresponding to FIG. 13A according to various embodiments of the present disclosure.

FIG. 13B is a schematic diagram illustrating an unhiding process corresponding to FIG. 13A. This embodiment may include the following operations.

Referring to FIG. 13A, a process of hiding the video fragment may include:

Operation 1301: Long press the progress bar on a video playing interface of the primary device, and select a start time point of hiding. Wherein, the operation of long pressing the progress bar on the video playing interface is a hiding instruction for a video fragment. And subsequently, a video fragment to be hidden needs to be selected.

Operation 1302: Pop up a start hiding confirmation window in which a prompt message "whether or not hide from this point?" is displayed. And the user selects "Yes".

Operation 1303: Long press the progress bar on a video playing interface of the primary device, and select a stop time point of hiding.

Operation 1304: Pop up a stop hiding confirmation window in which a prompt message "whether or not to stop hide from this point?" is displayed. And the user select "Yes".

The primary device hides the selected video fragment. Thus, if the video is re-played, the hidden video fragment will not be played.

Referring to FIG. 13B, a process of unhiding the video fragment may include:

Operation 1311: Long press the video region on the video playing interface of the primary device. Wherein, the operation of long pressing the video region on the video playing interface is an instruction for unhiding the hidden video fragment.

Operation 1312: Pop up an unhiding confirmation window. And the user selects "Yes". The primary device automatically searches whether there is an accessory device bound to the primary device around. If there is an accessory device bound to the primary device, the primary device may send an unhiding request to the accessory device.

Operation 1313: After receiving the unhiding request, the accessory device may pop up an unhiding interface, on which a prompt message of the unhiding operation, for example, a prompt message of "Dial clockwise to a target position" is displayed. Wherein, the operation of "Dial clockwise to a target position" is an unhiding operation. Alternatively, the prompt message may not be displayed in case that the user knows the unhiding operation. The user performs a dial operation on the unhiding interface according to the prompt message, that is, perform an operation of "Dial clockwise to a target position". If the accessory device determines that an operation input by the user is the same as the unhiding operation, the unhiding process succeeds, and an unhiding success response is then returned to the primary device.

And after receiving the unhiding success response, the primary device may unhide the hidden video fragment, that is, re-play the hidden video fragment.

Embodiment 7: Displaying Privacy Information on Separate Devices

In this embodiment, when receiving designated privacy information from outside, the primary device may hide the privacy information. And the privacy information may be displayed by the accessory device. The designated privacy information may be any of, for example, a check code for amending a password of an account, an online shopping check code, a bank statement bill short message and etc. In the related art methods, if the device receives the privacy information, the privacy information will display the privacy information directly. Therefore, the privacy information may be leaked easily. Nevertheless, the privacy information may be protected by using the following solution of this embodiment.

Figure 14:
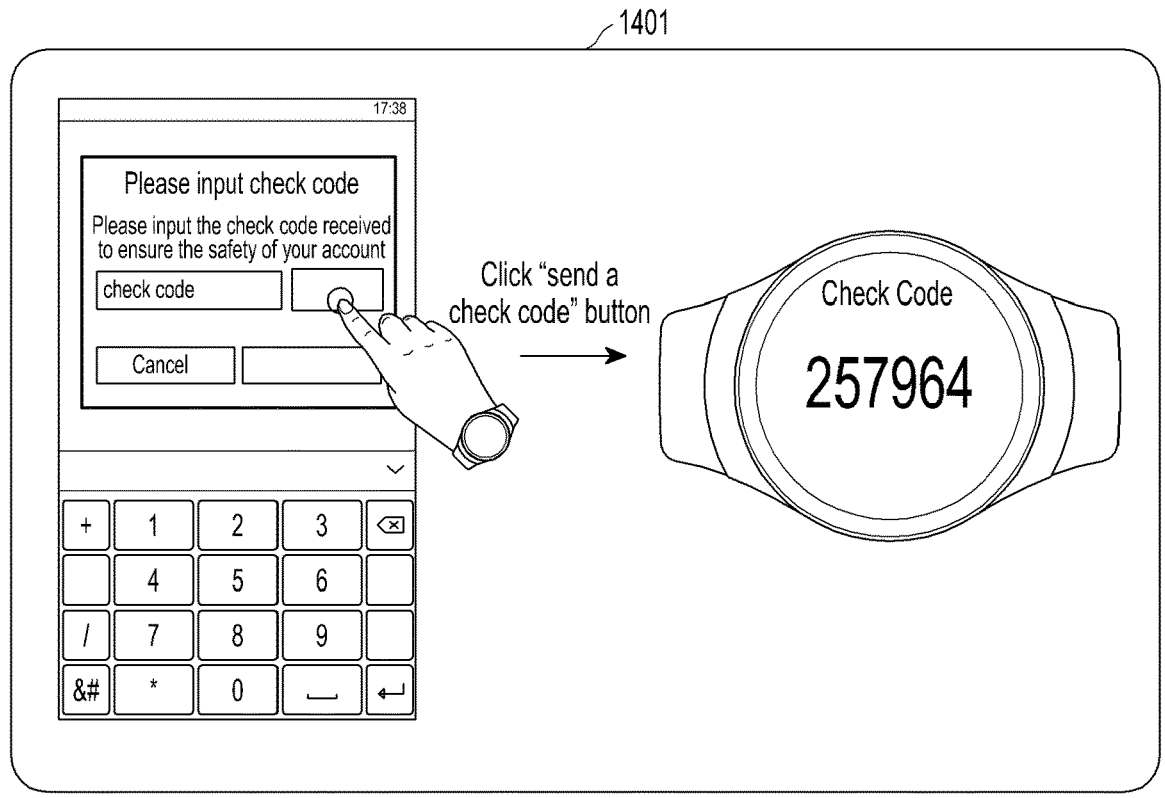
FIG. 14 is a schematic diagram illustrating a hiding process of privacy information received from outside according to various embodiments of the present disclosure.

FIG. 14 is a schematic diagram showing a hiding process of the privacy information received from outside according to various embodiments of the present disclosure. This embodiment may include:

Operation 1401: The primary device checks whether the information received from the outside has designated privacy information. If the information received from the outside has the designated privacy information, perform the next operation.

A specific checking method may be, for example, identifying whether the received information has sensitive words, such as "verification code", "bill", "password", or "check code" and etc. If the received information has one of these sensitive words, the primary device may determine that the received information has designated privacy information.

The left part of FIG. 14 is a schematic diagram of an interface of the primary device.

Referring to FIG. 14, if a user clicks the button of "sending a check code", a server may send a short message containing a check code to the primary device. After receiving the short message, the primary device may determine that there is a sensitive word "check code", and therefore, determine that the short message has the privacy information and needs to be hidden. The primary device automatically hides the privacy information, that is, the privacy information will not be displayed on the primary device. And the primary device may send the privacy information to the bound accessory device, so as to notify the accessory device to display the privacy information on the accessory device itself The right part of FIG. 14 is a schematic diagram of an interface of the accessory device. As shown in FIG. 14, after receiving the privacy information sent by the primary device, the accessory device displays the privacy information.

Embodiment 8: Setting of Different Encryption Priorities

In embodiment 8, if some target contents of the primary device are encrypted or hidden by a content provider, when a user sends a display operation of the target content, the primary device may automatically determine that the detected operation instruction for the target content is a preset decryption instruction or a preset unhiding instruction, and then sends a decryption request or a unhiding request to the bound accessory device.

For example, if the primary device is a television, for a graded program content, the program content is encrypted by the content provider. In other methods, if the primary device wants to watch the encrypted program content, a personal identification number (PIN) code provided by the content provider needs to be input though the primary device according to the related art. And the PIN code is easily to be leaked.

In this embodiment, interactions with the accessory device may replace the decryption method of PIN code inputting which is currently used. Through the accessory device bound with the television, the user may input a preset instruction to perform a decryption operation to watch the program (device recognition and a preset action). Identity verification and priority identification may be performed during the device binding process, which makes this method more safe and convenient.

Figure 15:
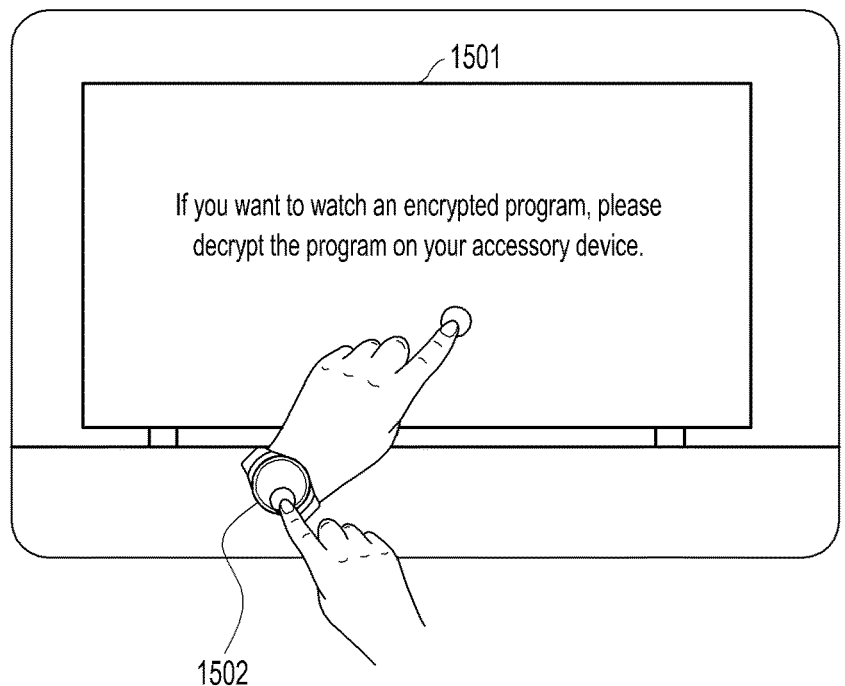
FIG. 15 is a schematic diagram illustrating a decryption process of the contact encrypted by a content provider according to various embodiments of the present disclosure.

FIG. 15 is a schematic diagram illustrating a decryption process of a contact encrypted by a content provider according to various embodiments of the present disclosure.

Referring to FIG. 15, a primary device 1501 is a television. When a user switches to an encrypted channel, the television automatically determines that a detected instruction on the encrypted channel is a preset decryption instruction and will then send a decryption request to a bound accessory device 1502 (for example, a smartwatch). During the decrypting process, the accessory device 1502 may set a decryption operation and a decryption password. If an operation input by the user on the accessory device 1502 is the decryption operation, a decryption success response may be returned to the primary device. The decryption success response may include the decryption password. After receiving the decryption success response, the primary device may automatically input the decryption password (the decryption password is not displayed). Then the encryption channel can be decrypted successfully. And after the decryption process succeeds, the content of the decryption channel can be played normally.

In view of the above, the present disclosure performs content encryption, decryption, hiding, and unhiding through multi-device cooperation. That is, through the cooperation between a primary device and an accessory device, encryption, decryption, hiding, and unhiding of contents on the primary device can be implemented. That is, more convenient content encryption, decryption, hiding, and unhiding methods are provided. By these methods, a user may quickly encrypt, decrypt, hide and unhide an application, a current page, an image, a contact, information, and a file on the primary device. Therefore, functions of the accessory device, especially the functions of wearable devices are greatly extended.

In the present disclosure, the encryption method through the cooperation between the primary device and the accessory device does not need any support of the fingerprint technology. And compared with the encryption method through gestures, the security of the method is also improved.

In the present disclosure, in the decryption process, an input operation of a soft keyboard is not required on the accessory device. Thus, compared with the decryption method by inputting a password, this method is more convenient. And the functions of a wearable device are greatly extended in the scenario that the accessory device is a wearable device. Thus the utilization of a wearable device is greatly improved.

In the present disclosure, by predetermining interactions, encryption/hiding settings can be performed on the primary device, also decryption/unhiding operations can be performed on the accessory device. The interactions may include any triggering operations suitable for the current scenario, such as voices, gestures, actions, human face recognition etc.

In the present disclosure, encryption/decryption or hiding/unhiding may be performed on multiple contents and pages of the primary device, which include an application, a page, an image, a contact, information, a video, a file, or even an audio. Therefore, the solution can be used widely.

According to the present disclosure, the multi-device encryption/decryption method can present great advantages in the aspect of security and information confidentiality, especially in case that the primary device is stolen or misoperated.

In addition, the functional modules of embodiments of the present disclosure may be integrated into one processing unit, or each of the modules may exist along physically, or two or more than two modules are integrated into one unit. The integrated unit may be implemented in the form of hardware, or implemented in the form of software functional unit. The functional modules of the embodiments may be located in one terminal or one network node, or may be distributed on multiple terminals or network nodes.

In addition, each embodiment of the present disclosure may be implemented by a data processing program, executed by a computer, of a data processing device. Obviously, the data processing program may compose the present disclosure. In addition, generally, the data processing program stored in one storage medium directly reads the storage medium or installs or duplicates the program to a storage device (for example, a hard disk or a memory) for execution. Therefore, such a storage medium also composes the present disclosure. The storage medium may use a record method of any type, for example, a paper storage medium (such as a paper tape), a magnetic storage medium (such as a soft disk, a hard disk, or a memory), an optical storage medium (such as compact disc read only memory (CD-ROM)), or a magnetic storage medium (such as magneto-optical (MO) media).

The present disclosure also discloses a storage medium, and the storage medium has a data processing capability. The data processing program of the storage medium is used to execute any embodiment of the methods of the present disclosure.

In addition, the methods and operations of the present disclosure may be implemented by the data processing program or implemented by hardware, for example, the methods and operations may be implemented by a logic gate, a switch, an application specific integrated circuit (ASIC), a programmable logic controller, an embedded microcontroller, and one or more processors. Therefore, the hardware that can implement the method of the present disclosure can also compose the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for processing a target object on a first device, the method comprising:
   connecting the first device with a second device;
   detecting a first operation instruction for the target object;
   outputting first information on a display of the first device to confirm an encrypting instruction of the target object based on the first operation instruction for the target object;
   after detecting a first confirmation input in response to outputting the first information, encrypting the target object;
   after encrypting the target object, sending an encryption success notification to the second device;
   receiving a first input identifying an authorization operation to be processed by the second device as a decryption operation with respect to a second input on the second device; and
   transmitting information related to the first input, to the second device.

2. The method according to claim 1, further comprising:
   outputting second information on the display of the first device to confirm a decrypting instruction of the target object based on the first operation instruction for the target object comprising a decryption instruction; and
   after detecting a second confirmation input in response to outputting the second information, decrypting the target object.

3. The method according to claim 1, further comprising, after receiving the first confirmation input, sending an encryption request to the second device.

4. The method according to claim 1, further comprising:
   after encrypting the target object, outputting an encryption success prompt message.

5. The method according to claim 1, wherein the connecting of the first device with the second device comprises:
pairing with the second device through a designated communication protocol;
prompting a user of the first device for an account number and a password;
receiving an account number input by the user and a password input by the user;
checking the account number input and the password input; and
connecting with the second device based on a result of the checking being successful.

6. The method according to claim 5, further comprising:
based on the result of the checking being successful, prompting the user for setting the decryption operation,
wherein the first input is detected in response to prompting the user for setting the decryption operation.

7. The method according to claim 5, further comprising:
in response to detecting an instruction to disconnect with the second device, prompting the user for the account number and the password;
receiving the account number input by the user and the password input by the user;
checking the account number input and the password input; and
disconnecting with the second device based on a result of the checking being successful.

8. The method according to claim 1, wherein the detecting of the first operation instruction for the target object comprises detecting the first operation instruction for contents of the target object.

9. The method according to claim 1, further comprising:
identifying whether information received comprises designated privacy information; and
hiding automatically the designated privacy information based on the information received comprising the designated privacy information.

10. The method according to claim 1, further comprising:
searching for the second device which is connected with the first device based on the first operation instruction for the target object being a preset decryption instruction; and
sending a decryption request to the second device based on the second device connected with the first device.

11. The method of claim 1, further comprising:
detecting a second operation instruction for the target object;
outputting second information on the display of the first device to confirm a hiding instruction of the target object based on the second operation instruction for the target object;
after detecting a first confirmation input in response to outputting the second information, hiding the target object;
after hiding the target object, sending a hiding success notification to the second device;
receiving a third input identifying an authorization operation to be processed by the second device as an unhiding operation with respect to a fourth input on the second device; and
transmitting information related to the third input, to the second device.

12. A first device comprising:
a transceiver configured to communicate with a second device;
a display;
at least one processor coupled to the transceiver; and
a memory coupled to the at least one processor, the memory being configured to store one or more computer programs to be executed by the at least one processor, the one or more computer programs including instructions that cause the at least one processor to:
connect the first device with the second device through the transceiver,
detect a first operation instruction for a target object,
output first information on the display to confirm an encrypting instruction of the target object based on the first operation instruction for the target object,
after detecting a first confirmation input in response to outputting the first information, encrypt the target object,
after encrypting the target object, send an encryption success notification to the second device,
receive a first input identifying an authorization operation to be processed by the second device as a decryption operation with respect to a second input on the second device, and
transmit information related to the first input, to the second device.

13. The first device according to claim 12, wherein the instructions further cause the at least one processor to:
output second information on the display to confirm a decrypting instruction of the target object based on the first operation instruction for the target object being determined to comprise a decryption instruction, and
after detecting a second confirmation input in response to outputting the second information, decrypt the target object.

14. The first device according to claim 12, wherein the instructions further cause the at least one processor to send a decryption request to the second device connected to the first device based on the first operation instruction being determined to comprise a decryption instruction.

15. The first device according to claim 12, wherein the instructions further cause the at least one processor to, after encrypting the target object, output an encryption success prompt message.

16. The first device according to claim 12, wherein the instructions further cause the at least one processor to:
pair with the second device through a designated communication protocol,
prompt a user of the first device for an account number and a password,
receive an account number input by the user and a password input by the user,
check the account number input and the password input, and
connect with the second device based on a result of the checking being successful.

17. The first device according to claim 16,
wherein the instructions further cause the at least one processor to:
based on the result of the checking being successful, prompt for setting the decryption operation, and
wherein the first input is detected in response to prompting the user for setting the decryption operation.

18. The first device according to claim 16, wherein the instructions further cause the at least one processor to:
in response to detecting an instruction to disconnect with the second device, prompt the user for the account number and the password,
receive the account number input by the user and the password input by the user, check the account number input and the password input, and disconnect with the second device based on a result of the checking being successful.

19. The first device according to claim 12, wherein the instructions further cause the at least one processor to:

search for the second device which is connected with the first device based on the first operation instruction for the target object being a preset decryption instruction, and send a decryption request to the second device based on the second device connected with the first device.

20. The first device according to claim 12, wherein the instructions further cause the at least one processor to:

identify whether information received by the first device comprises designated privacy information, hide automatically the designated privacy information based on the information received comprising the designated privacy information, and send the designated privacy information to the second device to notify the second device to display the designated privacy information on a display of the second device.

21. The first device of claim 12, wherein the instructions further cause the at least one processor to:

detect a second operation instruction for the target object, output second information on the display of the first device to confirm a hiding instruction of the target object based on the second operation instruction for the target object, after detecting a first confirmation input in response to outputting the second information, hide the target object, after hiding the target object, send a hiding success notification to the second device, receive a third input identifying an authorization operation to be processed by the second device as an unhiding operation with respect to a fourth input on the second device, and transmit information related to the third input, to the second device.

* * * * *